United States Patent
McNeil et al.

(10) Patent No.: US 12,444,453 B2
(45) Date of Patent: Oct. 14, 2025

(54) VOLATILE DATA STORAGE IN NAND MEMORY

(71) Applicant: MICRON TECHNOLOGY, INC., Boise, ID (US)

(72) Inventors: Jeffrey S. McNeil, Nampa, ID (US); Eric N. Lee, San Jose, CA (US); Tomoko Ogura Iwasaki, San Jose, CA (US); Sheyang Ning, San Jose, CA (US); Lawrence Celso Miranda, San Jose, CA (US); Kishore Kumar Muchherla, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 160 days.

(21) Appl. No.: 18/388,032

(22) Filed: Nov. 8, 2023

(65) Prior Publication Data

US 2024/0177755 A1   May 30, 2024

Related U.S. Application Data

(60) Provisional application No. 63/428,755, filed on Nov. 30, 2022.

(51) Int. Cl.
*G11C 16/04* (2006.01)
*G06F 12/02* (2006.01)
*G11C 11/00* (2006.01)

(52) U.S. Cl.
CPC ........ *G11C 11/005* (2013.01); *G06F 12/0246* (2013.01); *G11C 16/0483* (2013.01)

(58) Field of Classification Search
CPC ... G11C 11/005; G11C 16/0483; G11C 16/10; G06F 12/0246
USPC ...................................... 365/185.08
See application file for complete search history.

(56) References Cited

U.S. PATENT DOCUMENTS

| | | | | |
|---|---|---|---|---|
| 5,412,612 A * | 5/1995 | Oyama | ................ | G11C 16/102 365/228 |
| 5,590,073 A * | 12/1996 | Arakawa | ............... | G11C 7/1078 365/228 |
| 7,450,422 B2 | 11/2008 | Roohparvar | | |
| 7,489,546 B2 | 2/2009 | Roohparvar | | |
| 7,889,555 B2 * | 2/2011 | Lee | .................... | G11C 16/0483 365/185.12 |
| 8,218,348 B2 | 7/2012 | Roohparvar | | |
| 8,717,805 B2 * | 5/2014 | Kajigaya | ................ | G11C 14/00 365/158 |
| 2022/0180937 A1 | 6/2022 | Fukuzumi et al. | | |

* cited by examiner

*Primary Examiner* — Tha-O H Bui
(74) *Attorney, Agent, or Firm* — Dicke, Billig & Czaja, PLLC

(57) ABSTRACT

Memories might include an array of memory cells having a plurality of strings of series-connected memory cells and a controller configured to cause to memory to access a first string of series-connected memory cells of the plurality of strings of series-connected memory cells in a first mode of operation for volatile storage of data to the first string of series-connected memory cells, and access a second string of series-connected memory cells of the plurality of strings of series-connected memory cells in a second mode of operation for non-volatile storage of respective data to each memory cell of a plurality of memory cells of the second string of series-connected memory cells

20 Claims, 19 Drawing Sheets

VOLATILE DATA STORAGE IN NAND MEMORY

RELATED APPLICATIONS

This application claims the benefit of U.S. Provisional Application No. 63/428,755, filed on Nov. 30, 2022, hereby incorporated herein in its entirety by reference.

TECHNICAL FIELD

The present disclosure relates generally to integrated circuits, and, in particular, in one or more embodiments, the present disclosure relates to memories having strings of series-connected memory cells and configured for volatile storage of data.

BACKGROUND

Memories (e.g., memory devices) are typically provided as internal, semiconductor, integrated circuit devices in computers or other electronic devices. There are many different types of memory including random-access memory (RAM), read only memory (ROM), dynamic random access memory (DRAM), synchronous dynamic random access memory (SDRAM), and flash memory.

RAM is a popular source of volatile memory in which data is typically stored as individual charges, or lack thereof, placed in memory cells having capacitors connected to select gates in the RAM memory array. To access and read the data, the select gates of the selected memory cells are activated and the charge stored on the associated memory cell capacitors are connected to data lines. A resulting change, or lack thereof, of the voltage level of the data line can be sensed to indicate the data value stored to a memory cell. As this data read removes the charge stored in the selected memory cell capacitors the data must then be rewritten back into the selected cells so that it is available for any future access. In addition, as the memory cell capacitors typically slowly leak charge, the charges on the capacitors of the array must be periodically refreshed by being read and written back into the cell in a refresh operation, maintaining the data contents.

Flash memory has developed into a popular source of non-volatile memory for a wide range of electronic applications. Flash memory typically use a one-transistor memory cell that allows for high memory densities, high reliability, and low power consumption. Changes in threshold voltage (Vt) of the memory cells, through programming (which is often referred to as writing) of charge storage structures (e.g., floating gates or charge traps) or other physical phenomena (e.g., phase change or polarization), determine the data state (e.g., data value) of each memory cell. Common uses for flash memory and other non-volatile memory include personal computers, personal digital assistants (PDAs), digital cameras, digital media players, digital recorders, games, appliances, vehicles, wireless devices, mobile telephones, and removable memory modules, and the uses for non-volatile memory continue to expand.

A NAND flash memory, or simply NAND memory, is a common type of flash memory device, so called for the logical form in which the basic memory cell configuration is arranged. Typically, the array of memory cells for NAND memory is arranged such that the control gate of each memory cell of a row of the array is connected together to form an access line, such as a word line. Columns of the array include strings (often termed NAND strings) of memory cells connected together in series between a pair of select gates, e.g., a source select transistor and a drain select transistor. Each source select transistor might be connected to a source, while each drain select transistor might be connected to a data line, such as column bit line. Variations using more than one select gate between a string of memory cells and the source, and/or between the string of memory cells and the data line, are known.

In programming a traditional NAND memory, memory cells might be programmed as what are often termed single-level cells (SLC). SLC might use a single memory cell to represent one digit (e.g., one bit) of data. For example, in SLC, a Vt of 2.5V or higher might indicate a programmed memory cell (e.g., representing a logical 0) while a Vt of −0.5V or lower might indicate an erased memory cell (e.g., representing a logical 1). Such memory might achieve higher levels of storage capacity by including multi-level cells (MLC), triple-level cells (TLC), quad-level cells (QLC), etc., or combinations thereof in which the memory cell has multiple levels that enable more digits of data to be stored in each memory cell. For example, MLC might be configured to store two digits of data per memory cell represented by four Vt ranges, TLC might be configured to store three digits of data per memory cell represented by eight Vt ranges, QLC might be configured to store four digits of data per memory cell represented by sixteen Vt ranges, and so on.

DETAILED DESCRIPTION

Figure 1:
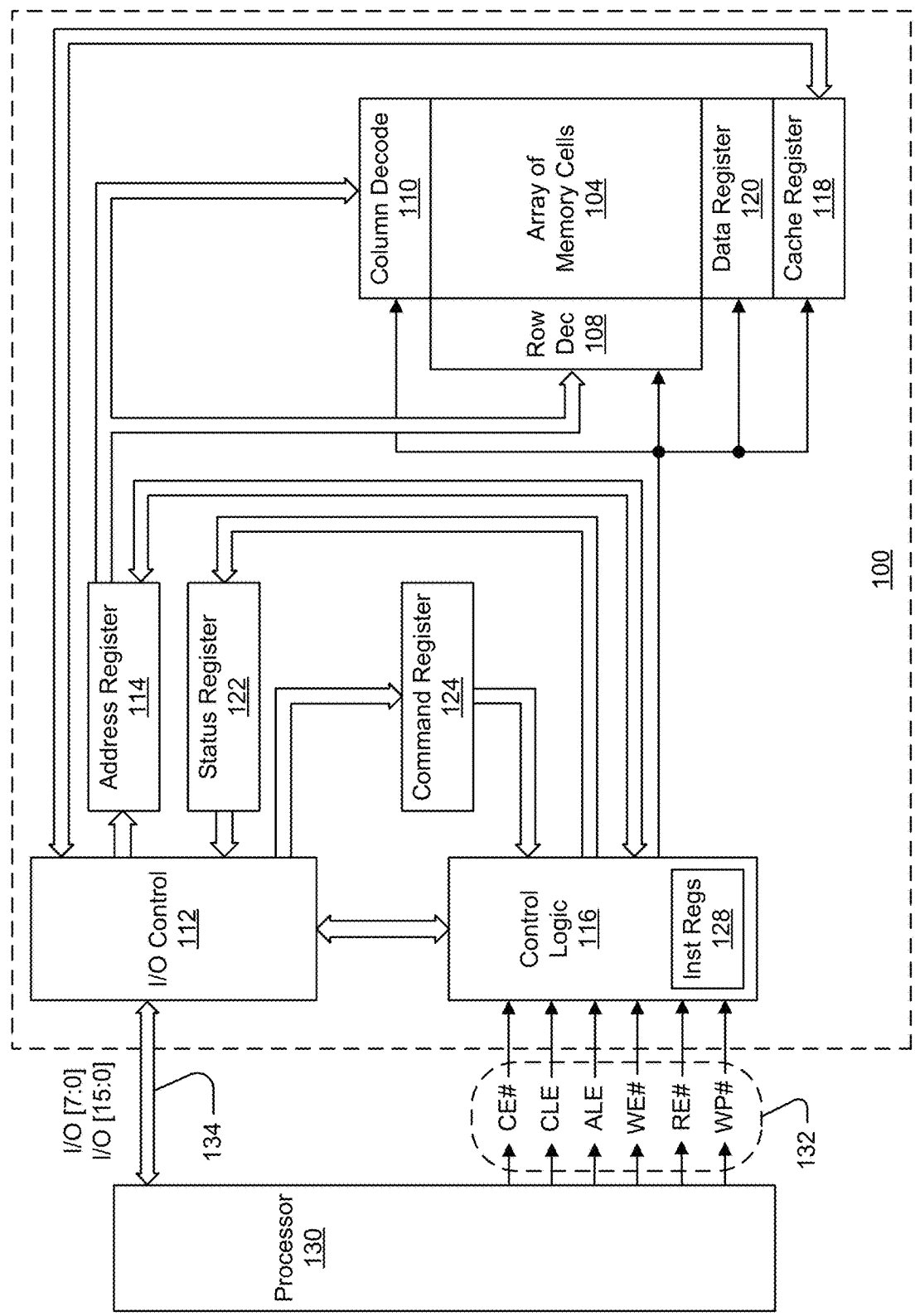
FIG. 1 is a simplified block diagram of a memory in communication with a processor as part of an electronic system, according to an embodiment.

In the following detailed description, reference is made to the accompanying drawings that form a part hereof, and in which is shown, by way of illustration, specific embodiments. In the drawings, like reference numerals describe substantially similar components throughout the several views. Other embodiments might be utilized and structural, logical and electrical changes might be made without departing from the scope of the present disclosure. The following detailed description is, therefore, not to be taken in a limiting sense.

The term "semiconductor" used herein can refer to, for example, a layer of material, a wafer, or a substrate, and includes any base semiconductor structure. "Semiconductor" is to be understood as including silicon-on-sapphire (SOS) technology, silicon-on-insulator (SOI) technology, thin film transistor (TFT) technology, doped and undoped semiconductors, epitaxial layers of a silicon supported by a base semiconductor structure, as well as other semiconductor structures well known to one skilled in the art. Furthermore, when reference is made to a semiconductor in the following description, previous process steps might have been utilized to form regions/junctions in the base semiconductor structure, and the term semiconductor can include the underlying layers containing such regions/junctions.

The term "conductive" as used herein, as well as its various related forms, e.g., conduct, conductively, conducting, conduction, conductivity, etc., refers to electrically conductive unless otherwise apparent from the context. Similarly, the term "connecting" as used herein, as well as its various related forms, e.g., connect, connected, connection, etc., refers to electrically connecting by an electrically conductive path unless otherwise apparent from the context.

It is recognized herein that even where values might be intended to be equal, variabilities and accuracies of industrial processing and operation might lead to differences from their intended values. These variabilities and accuracies will generally be dependent upon the technology utilized in fabrication and operation of the integrated circuit device. As such, if values are intended to be equal, those values are deemed to be equal regardless of their resulting values.

Mobile, enterprise, and client systems typically follow a standard memory hierarchy. Each tier of that hierarchy is typically set up to be in separate integrated circuits across a printed circuit board, or within a package with some sort of trace contact between each integrated circuit device. Communication between these individual devices is typically carried over a bus, and is often performed serially at some data rate.

DRAM is often used as a caching scheme to prepare data for long-term storage. In this scheme, data might typically go from the DRAM through some bus or buffer to the I/O circuitry for a NAND memory, then to the page buffers of the NAND memory to be written to its memory cells. This communication can take a significant amount of time, and the architecture can further take a fair amount of real-estate on a printed circuit board or within a package.

In addition, as operations within a NAND memory become more complex or varied, e.g., operations such as selective slow programming convergence (SSPC), multi-level inhibit modes, hybrid operations, test-mode operations, etc., the desire for additional volatile storage of data might increase. In traditional schemes, this leads to increased demands on available circuit real-estate.

Various embodiments provide for operation of NAND memory arrays as volatile memory, e.g., for volatile storage of data. As will be described herein, such embodiments might approach access rates and data retention characteristics of traditional DRAM. Furthermore, various embodiments might facilitate use of blocks of memory cells that are deemed unsuitable for traditional non-volatile storage of data to individual memory cells, thus blocks of memory cells deemed defective for non-volatile storage of data might be repurposed for volatile storage of data. For example, various embodiments might facilitate volatile storage of data to blocks of memory cells containing access lines that are electrically shorted to one another. As such, this could provide volatile memory capacity to a NAND memory without affecting its non-volatile memory capacity. Various embodiments might further be selectively operated in a first operating mode for volatile storage of data, or in a second operating mode for non-volatile storage of data, thus facilitating greater flexibility to tailor the volatile and non-volatile memory capacities to a particular application. For memories utilizing defective strings of series-connected memory cells for storing volatile data, those memories might be configured to prohibit storage of non-volatile data to those defective strings of series-connected memory cells. The following disclosure will discuss NAND memory in a traditional sense as it is used for non-volatile storage of data, and then discuss how the architecture of the array of memory cells could further be utilized for volatile storage of data.

FIG. 1 is a simplified block diagram of a first apparatus, in the form of a memory (e.g., memory device) 100, in communication with a second apparatus, in the form of a processor 130, as part of a third apparatus, in the form of an electronic system, according to an embodiment. Some examples of electronic systems include personal computers, personal digital assistants (PDAs), digital cameras, digital media players, digital recorders, games, appliances, vehicles, wireless devices, mobile telephones and the like. The processor 130, e.g., a controller external to the memory device 100, might be a memory controller or other external host device.

Memory device 100 includes an array of memory cells 104 that might be logically arranged in rows and columns. Memory cells of a logical row are typically connected to the same access line (commonly referred to as a word line) while memory cells of a logical column are typically selectively connected to the same data line (commonly referred to as a bit line). A single access line might be associated with more than one logical row of memory cells and a single data line might be associated with more than one logical column. Memory cells (not shown in FIG. 1) of at least a portion of array of memory cells 104 are capable of being programmed to one of at least two target data states.

A row decode circuitry 108 and a column decode circuitry 110 are provided to decode address signals. Address signals are received and decoded to access the array of memory cells 104. Memory device 100 also includes input/output (I/O) control circuitry 112 to manage input of commands, addresses and data to the memory device 100 as well as output of data and status information from the memory device 100. An address register 114 is in communication with I/O control circuitry 112 and row decode circuitry 108 and column decode circuitry 110 to latch the address signals prior to decoding. A command register 124 is in communication with I/O control circuitry 112 and control logic 116 to latch incoming commands.

A controller (e.g., the control logic 116 internal to the memory device 100) controls access to the array of memory cells 104 in response to the commands and might generate status information for the external processor 130, i.e., control logic 116 is configured to perform array operations (e.g., sensing operations [which might include read operations and verify operations], programming operations and/or erase operations) on the array of memory cells 104 in accordance with embodiments. The control logic 116 is in communication with row decode circuitry 108 and column decode circuitry 110 to control the row decode circuitry 108 and column decode circuitry 110 in response to the addresses. The control logic 116 might include instruction registers 128 which might represent computer-usable memory for storing computer-readable instructions. For some embodiments, the instruction registers 128 might represent firmware. Alternatively, the instruction registers 128 might represent a grouping of memory cells, e.g., reserved block(s) of memory cells, of the array of memory cells 104.

Control logic 116 might also be in communication with a cache register 118. Cache register 118 latches data, either incoming or outgoing, as directed by control logic 116 to temporarily store data while the array of memory cells 104 is busy writing or reading, respectively, other data. During a programming operation (e.g., write operation), data might be passed from the cache register 118 to the data register 120 for transfer to the array of memory cells 104, then new data might be latched in the cache register 118 from the I/O control circuitry 112. During a read operation, data might be passed from the cache register 118 to the I/O control circuitry 112 for output to the external processor 130, then new data might be passed from the data register 120 to the cache register 118. The cache register 118 and/or the data register 120 might form (e.g., might form a portion of) a page buffer of the memory device 100. A data register 120 might further include sense circuits (not shown in FIG. 1) to sense a data state of a memory cell of the array of memory cells 104, e.g., by sensing a state of a data line connected to that memory cell. A status register 122 might be in communication with I/O control circuitry 112 and control logic 116 to latch the status information for output to the processor 130.

Memory device 100 receives control signals at control logic 116 from processor 130 over a control link 132. The control signals might include a chip enable CE #, a command latch enable CLE, an address latch enable ALE, a write enable WE #, a read enable RE #, and a write protect WP #. Additional or alternative control signals (not shown) might be further received over control link 132 depending upon the nature of the memory device 100. Memory device 100 receives command signals (which represent commands), address signals (which represent addresses), and data signals (which represent data) from processor 130 over a multiplexed input/output (I/O) bus 134 and outputs data to processor 130 over I/O bus 134.

For example, the commands might be received over input/output (I/O) pins [7:0] of I/O bus 134 at I/O control circuitry 112 and might then be written into command register 124. The addresses might be received over input/output (I/O) pins [7:0] of I/O bus 134 at I/O control circuitry 112 and might then be written into address register 114. The data might be received over input/output (I/O) pins [7:0] for an 8-bit device or input/output (I/O) pins [15:0] for a 16-bit device at I/O control circuitry 112 and then might be written into cache register 118. The data might be subsequently written into data register 120 for programming the array of memory cells 104. For another embodiment, cache register 118 might be omitted, and the data might be written directly into data register 120. Data might also be output over input/output (I/O) pins [7:0] for an 8-bit device or input/output (I/O) pins [15:0] for a 16-bit device. Although reference might be made to I/O pins, they might include any conductive nodes providing for electrical connection to the memory device 100 by an external device (e.g., processor 130), such as conductive pads or conductive bumps as are commonly used.

It will be appreciated by those skilled in the art that additional circuitry and signals can be provided, and that the memory device 100 of FIG. 1 has been simplified. It should be recognized that the functionality of the various block components described with reference to FIG. 1 might not necessarily be segregated to distinct components or component portions of an integrated circuit device. For example, a single component or component portion of an integrated circuit device could be adapted to perform the functionality of more than one block component of FIG. 1. Alternatively, one or more components or component portions of an integrated circuit device could be combined to perform the functionality of a single block component of FIG. 1.

Additionally, while specific I/O pins are described in accordance with popular conventions for receipt and output of the various signals, it is noted that other combinations or numbers of I/O pins (or other I/O node structures) might be used in the various embodiments.

Figure 2A:
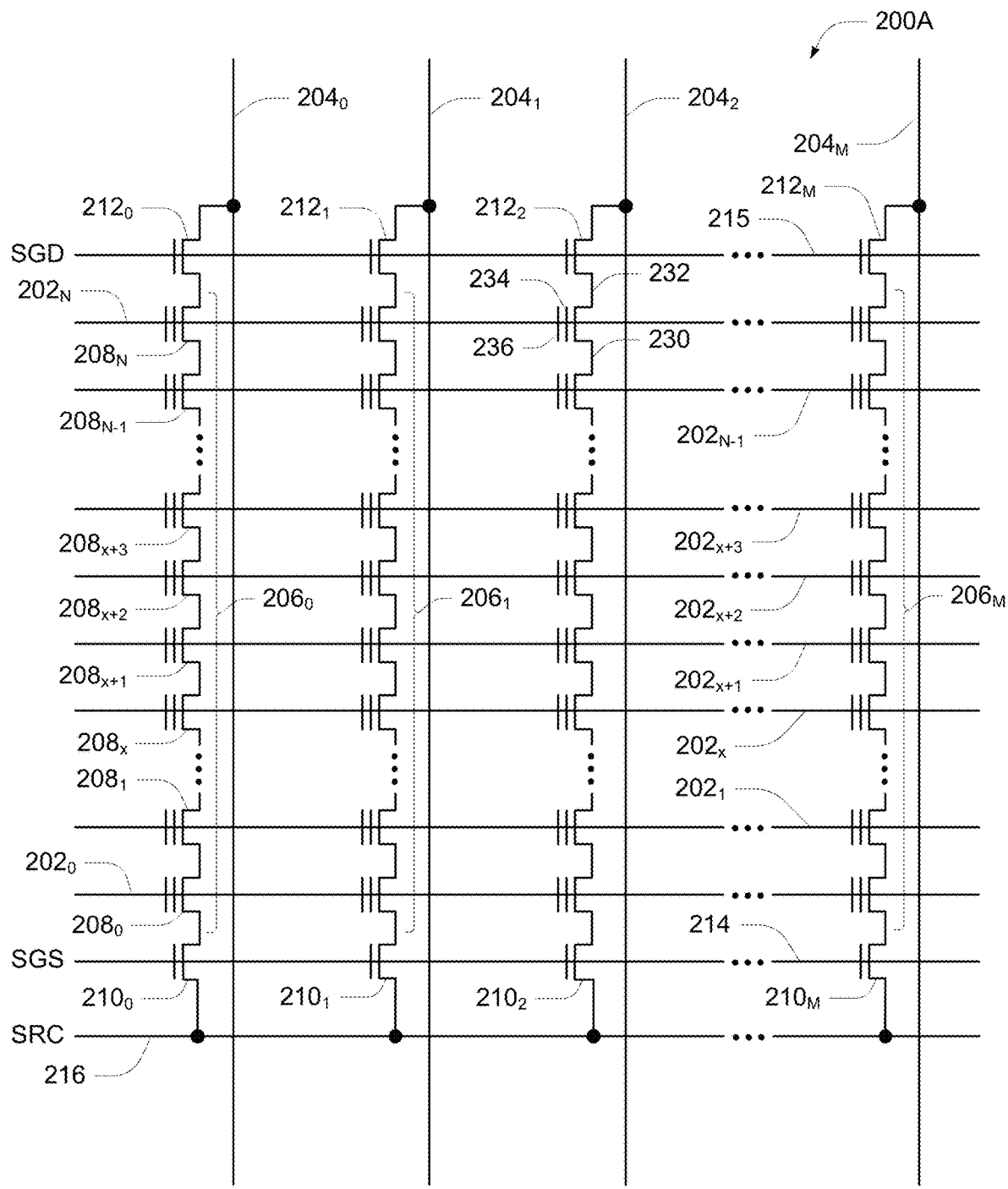
FIGS. 2A-2C are schematics of portions of an array of memory cells as could be used in a memory of the type described with reference to FIG. 1.

FIG. 2A is a schematic of a portion of an array of memory cells 200A, such as a NAND memory array, as could be used in a memory of the type described with reference to FIG. 1, e.g., as a portion of array of memory cells 104. Memory array 200A includes access lines (e.g., word lines) $202_0$ to $202_N$, and data lines (e.g., bit lines) $204_0$ to $204_M$. The access lines 202 might be connected to global access lines (e.g., global word lines), not shown in FIG. 2A, in a many-to-one relationship. For some embodiments, memory array 200A might be formed over a semiconductor that, for example, might be conductively doped to have a conductivity type, such as a p-type conductivity, e.g., to form a p-well, or an n-type conductivity, e.g., to form an n-well.

Memory array 200A might be arranged in rows (each corresponding to an access line 202) and columns (each corresponding to a data line 204). Each column might include a string of series-connected memory cells (e.g., non-volatile memory cells), such as one of NAND strings $206_0$ to $206_M$. Each NAND string 206 might be connected (e.g., selectively connected) to a common source (SRC) 216 and might include memory cells $208_0$ to $208_N$. The memory cells 208 might represent non-volatile memory cells for storage of data. The memory cells $208_0$ to $208_N$ might include memory cells intended for storage of data, and might further include other memory cells not intended for storage of data, e.g., dummy memory cells. Dummy memory cells are typically not accessible to a user of the memory, and are instead typically incorporated into the string of series-connected memory cells for operational advantages that are well understood.

The memory cells 208 of each NAND string 206 might be connected in series between a select gate 210 (e.g., a field-effect transistor), such as one of the select gates $210_0$ to $210_M$ (e.g., that might be source select transistors, commonly referred to as select gate source), and a select gate 212 (e.g., a field-effect transistor), such as one of the select gates $212_0$ to $212_M$ (e.g., that might be drain select transistors, commonly referred to as select gate drain). Select gates $210_0$ to $210_M$ might be commonly connected to a select line 214, such as a source select line (SGS), and select gates $212_0$ to $212_M$ might be commonly connected to a select line 215, such as a drain select line (SGD). Although depicted as traditional field-effect transistors, the select gates 210 and 212 might utilize a structure similar to (e.g., the same as) the memory cells 208. The select gates 210 and 212 might represent a plurality of select gates connected in series, with each select gate in series configured to receive a same or independent control signal.

A source of each select gate 210 might be connected to common source 216. The drain of each select gate 210 might be connected to a memory cell $208_0$ of the corresponding NAND string 206. For example, the drain of select gate $210_0$ might be connected to memory cell $208_0$ of the corresponding NAND string $206_0$. Therefore, each select gate 210 might be configured to selectively connect a corresponding NAND string 206 to common source 216. A control gate of each select gate 210 might be connected to select line 214.

The drain of each select gate 212 might be connected to the data line 204 for the corresponding NAND string 206. For example, the drain of select gate $212_0$ might be connected to the data line $204_0$ for the corresponding NAND string $206_0$. The source of each select gate 212 might be connected to a memory cell $208_N$ of the corresponding NAND string 206. For example, the source of select gate $212_0$ might be connected to memory cell $208_N$ of the corresponding NAND string $206_0$. Therefore, each select gate 212 might be configured to selectively connect a corresponding NAND string 206 to the corresponding data line 204. A control gate of each select gate 212 might be connected to select line 215.

The memory array in FIG. 2A might be a quasi-two-dimensional memory array and might have a generally planar structure, e.g., where the common source 216, NAND strings 206 and data lines 204 extend in substantially parallel planes. Alternatively, the memory array in FIG. 2A might be a three-dimensional memory array, e.g., where NAND strings 206 might extend substantially perpendicular to a plane containing the common source 216 and to a plane containing the data lines 204 that might be substantially parallel to the plane containing the common source 216.

Typical construction of memory cells 208 includes a data-storage structure 234 (e.g., a floating gate, charge trap, or other structure configured to store charge) that can determine a data state of the memory cell (e.g., through changes in threshold voltage), and a control gate 236, as shown in FIG. 2A. The data-storage structure 234 might include both conductive and dielectric structures while the control gate 236 is generally formed of one or more conductive materials. In some cases, memory cells 208 might further have a defined source/drain (e.g., source) 230 and a defined source/drain (e.g., drain) 232. Memory cells 208 have their control gates 236 connected to (and in some cases form) an access line 202.

A column of the memory cells 208 might be a NAND string 206 or a plurality of NAND strings 206 selectively connected to a given data line 204. A row of the memory cells 208 might be memory cells 208 commonly connected to a given access line 202. A row of memory cells 208 can, but need not, include all memory cells 208 commonly connected to a given access line 202. Rows of memory cells 208 might often be divided into one or more groups of physical pages of memory cells 208, and physical pages of memory cells 208 often include every other memory cell 208 commonly connected to a given access line 202. For example, memory cells 208 commonly connected to access line $202_N$ and selectively connected to even data lines 204 (e.g., data lines $204_0$, $204_2$, $204_4$, etc.) might be one physical page of memory cells 208 (e.g., even memory cells) while memory cells 208 commonly connected to access line $202_N$ and selectively connected to odd data lines 204 (e.g., data lines $204_1$, $204_3$, $204_5$, etc.) might be another physical page of memory cells 208 (e.g., odd memory cells). Although data lines $204_3$-$204_5$ are not explicitly depicted in FIG. 2A, it is apparent from the figure that the data lines 204 of the array of memory cells 200A might be numbered consecutively from data line $204_0$ to data line $204_M$. Other groupings of memory cells 208 commonly connected to a given access line 202 might also define a physical page of memory cells 208. For certain memory devices, all memory cells commonly connected to a given access line might be deemed a physical page of memory cells. The portion of a physical page of memory cells (which, in some embodiments, could still be the entire row) that is read during a single read operation or programmed during a single programming operation (e.g., an upper or lower page of memory cells) might be deemed a logical page of memory cells. A block of memory cells might include those memory cells that are configured to be erased together, such as all memory cells connected to access lines $202_0$-$202_N$ (e.g., all NAND strings 206 sharing common access lines 202). Unless expressly distinguished, a reference to a page of memory cells herein refers to the memory cells of a logical page of memory cells.

Figure 2B:
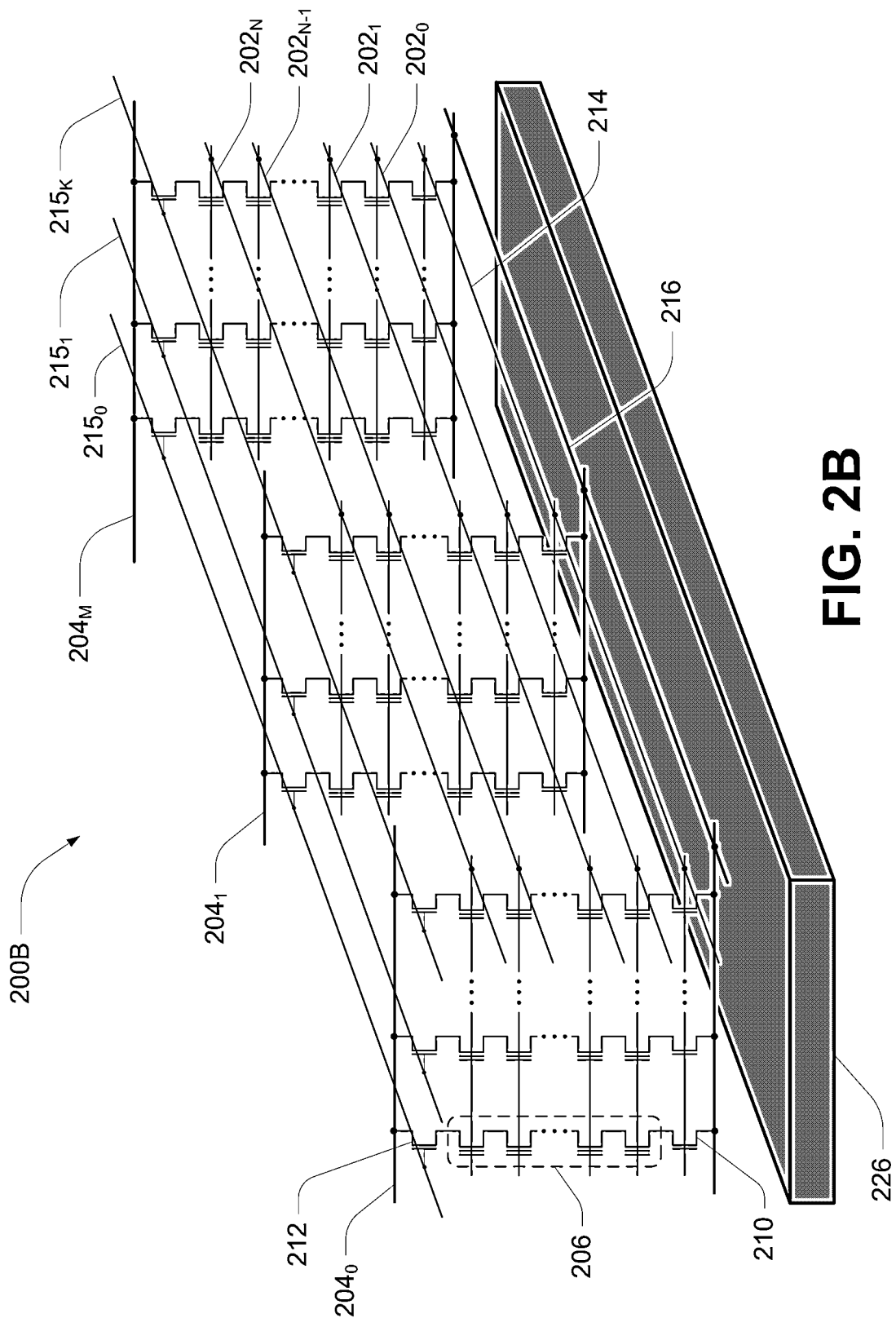

FIG. 2B is another schematic of a portion of an array of memory cells 200B as could be used in a memory of the type described with reference to FIG. 1, e.g., as a portion of array of memory cells 104. Like numbered elements in FIG. 2B correspond to the description as provided with respect to FIG. 2A. FIG. 2B provides additional detail of one example of a three-dimensional NAND memory array structure. The three-dimensional NAND memory array 200B might incorporate vertical structures which might include semiconductor pillars, which might be solid or hollow, where a portion of a pillar might act as a channel region of the memory cells of NAND strings 206, e.g., a region through which current might flow when a memory cell, e.g., a field-effect transistor, is activated. The NAND strings 206 might be each selectively connected to a data line $204_0$-$204_M$ by a select gate 212 (e.g., that might be drain select transistors, commonly referred to as select gate drain) and to a common source 216 by a select gate 210 (e.g., that might be source select transistors, commonly referred to as select gate source). Multiple NAND strings 206 might be selectively connected to the same data line 204. Subsets of NAND strings 206 can be connected to their respective data lines 204 by biasing the select lines $215_0$-$215_K$ to selectively activate particular select gates 212 each between a NAND string 206 and a data line 204. The select gates 210 can be activated by biasing the select line 214. Each access line 202 might be connected to multiple rows of memory cells of the memory array 200B. Rows of memory cells that are commonly connected to each other by a particular access line 202 might collectively be referred to as tiers.

The three-dimensional NAND memory array 200B might be formed over peripheral circuitry 226. The peripheral circuitry 226 might represent a variety of circuitry for accessing the memory array 200B. The peripheral circuitry 226 might include complementary circuit elements. For example, the peripheral circuitry 226 might include both n-channel region and p-channel region transistors formed on a same semiconductor substrate, a process commonly referred to as CMOS, or complementary metal-oxide-semiconductors. Although CMOS often no longer utilizes a strict metal-oxide-semiconductor construction due to advancements in integrated circuit fabrication and design, the CMOS designation remains as a matter of convenience.

Figure 2C:
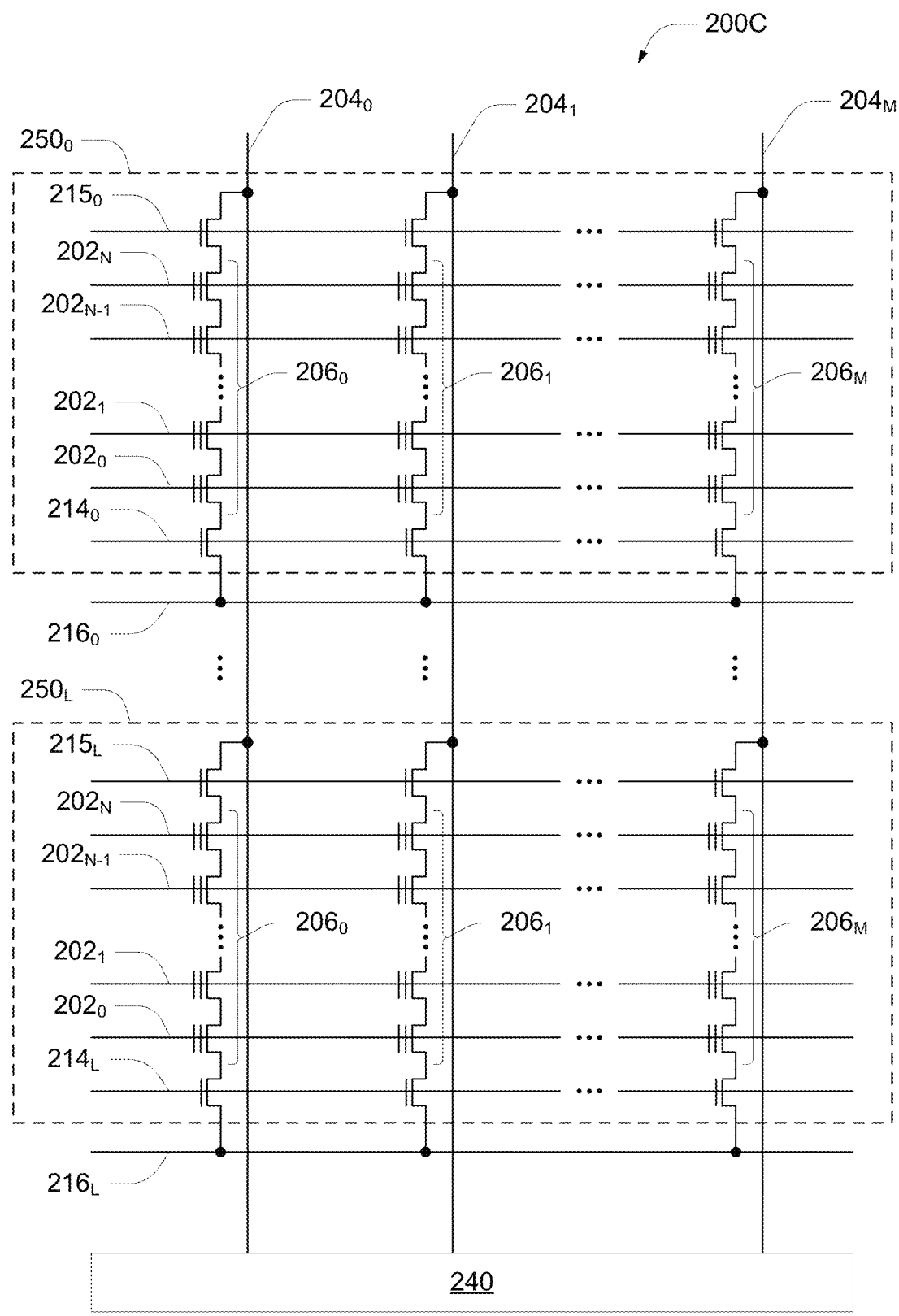

FIG. 2C is a further schematic of a portion of an array of memory cells 200C as could be used in a memory of the type described with reference to FIG. 1, e.g., as a portion of array of memory cells 104. Like numbered elements in FIG. 2C correspond to the description as provided with respect to FIG. 2A. Array of memory cells 200C might include strings of series-connected memory cells (e.g., NAND strings) 206, access (e.g., word) lines 202, data (e.g., bit) lines 204, select lines 214 (e.g., source select lines), select lines 215 (e.g., drain select lines) and source 216 as depicted in FIG. 2A. A portion of the array of memory cells 200A might be a portion of the array of memory cells 200C, for example. FIG. 2C depicts groupings of NAND strings 206 into blocks of memory cells 250, e.g., blocks of memory cells $250_0$-$250_L$. Blocks of memory cells 250 might be groupings of memory cells 208 that might be erased together in a single erase operation, sometimes referred to as erase blocks. Each block of memory cells 250 might represent those NAND strings 206 commonly associated with a single select line 215, e.g., select line $215_0$. The source 216 for the block of memory cells $250_0$ might be a same source as the source 216 for the block of memory cells $250_L$. For example, each block of memory cells $250_0$-$250_L$ might be commonly selectively connected to the source 216. Access lines 202 and select lines 214 and 215 of one block of memory cells 250 might have no direct connection to access lines 202 and select lines 214 and 215, respectively, of any other block of memory cells of the blocks of memory cells $250_0$-$250_L$.

The data lines $204_0$-$204_M$ might be connected (e.g., selectively connected) to a buffer portion 240, which might be a portion of a page buffer of the memory. The buffer portion 240 might correspond to a memory plane (e.g., the set of blocks of memory cells $250_0$-$250_L$). The buffer portion 240 might include sense circuits (not shown in FIG. 2C) for sensing data values indicated on respective data lines 204.

Figure 3:
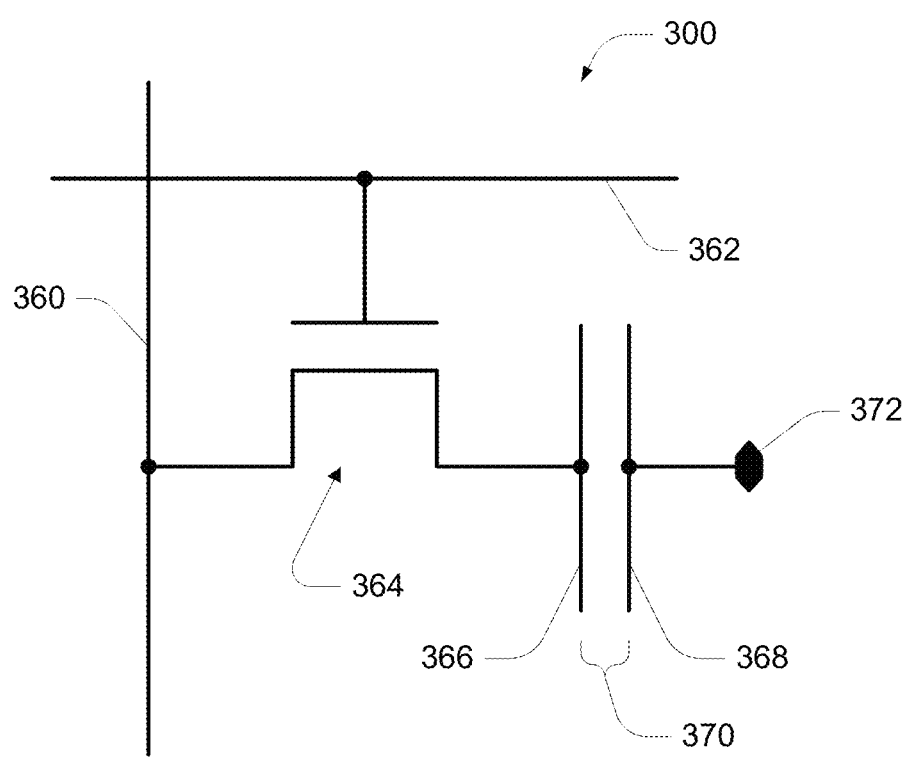
FIG. 3 is a schematic of a typical volatile memory cell.

FIG. 3 is a schematic of a typical volatile memory cell 300. As depicted in FIG. 3, the volatile memory cell 300 has a first source/drain region of an access transistor 364 connected to a first electrode 366 of a capacitor 370. A second electrode 368 of the capacitor 370 is connected to a voltage node 372. The voltage node 372 might be configured to receive a reference potential, e.g., Vss, 0V, or ground. A control gate of the access transistor 364 is connected to an access line 362, while a second source/drain region of the access transistor 364 is connected to a data line 360.

Programming of the volatile memory cell 300 might involve applying a voltage level to the data line 360 responsive to a desired data state of the volatile memory cell 300, and activating the access transistor 364 responsive to a voltage level of the access line 362. This might connect the first electrode 366 of the capacitor 370 to the data line 360, and electrical charge might then be selectively added or removed from the capacitor 370 depending upon the voltage level of the data line 360. Sensing, or reading, the volatile memory cell 300 might involve activating the access transistor 364 responsive to a voltage level of the access line 362, thereby connecting the first electrode 366 of the capacitor 370 to the data line 360. A voltage change of the data line 360 resulting from charge-sharing with the capacitor 370 might indicate the data state of the volatile memory cell 300. As is common, such volatile memory generally requires refreshing a stored data state periodically because of charge leakage from the capacitor 370. This might involve periodically reading the volatile memory cell 300 to determine its intended data state, and then re-programming that data state to the volatile memory cell 300.

Figure 4:
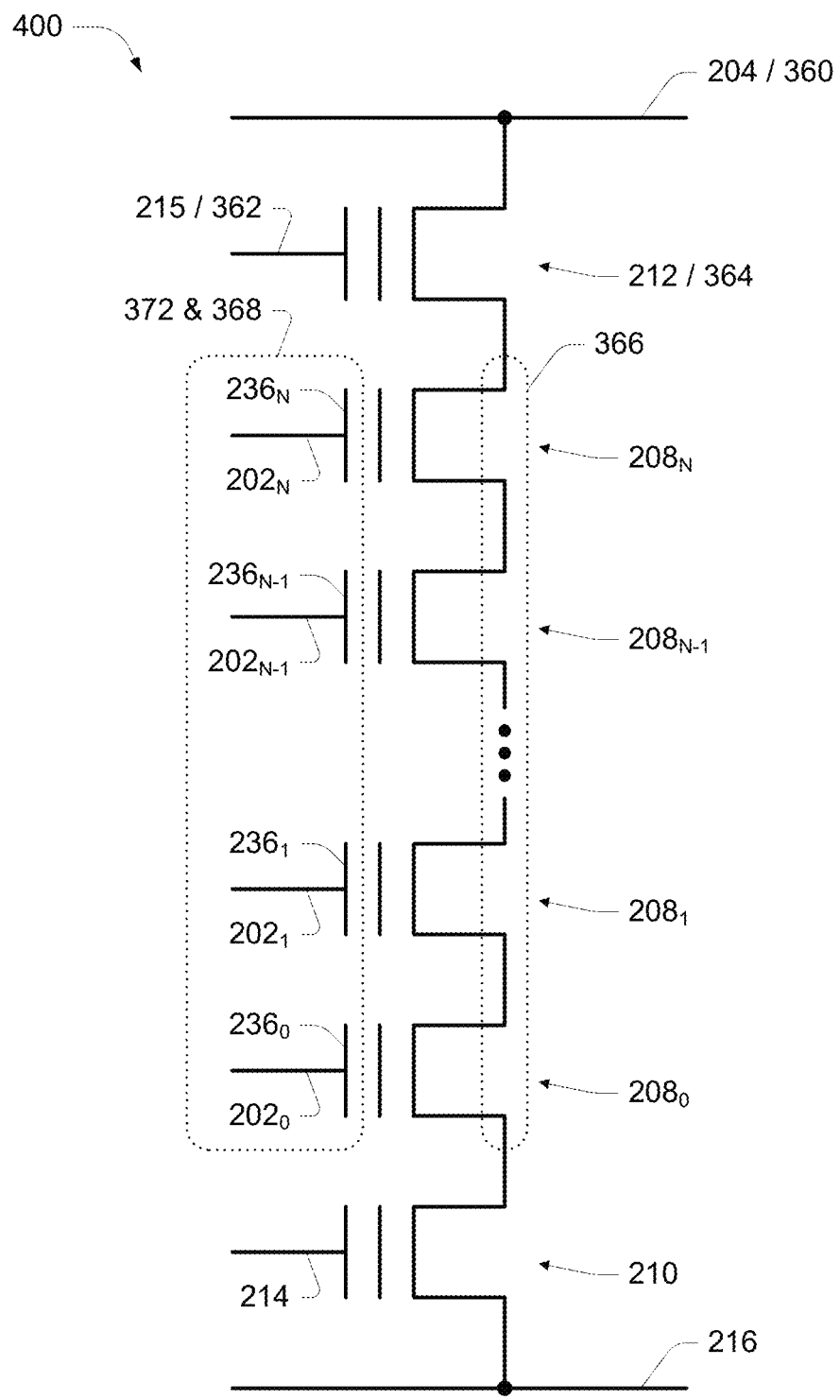
FIG. 4 is a schematic of a NAND memory array structure demonstrating components that could correspond to the elements of a volatile memory cell such as depicted in FIG. 3.

FIG. 4 is a schematic of a NAND memory array structure 400 demonstrating components that could correspond to the elements of a volatile memory cell such as depicted in FIG. 3. Like numbered elements in FIG. 4 correspond to the description as provided with respect to FIG. 2A and FIG. 3. In FIG. 4, the data line 204 of the NAND memory array structure 400 might correspond to the data line 360 of the volatile memory cell 300, connected to a source/drain region of its access transistor 364. The drain select transistor 212 of the NAND memory array structure 400, e.g., one or more drain select transistors 212 connected in series, might correspond to the access transistor 364 of the volatile memory cell 300. The drain select line 215 of the NAND memory array structure 400, or one or more respective drain select lines 215 for one or more drain select transistors 212 connected in series, might correspond to the access line 362 of the volatile memory cell 300. The access lines 202 and corresponding control gates 236 of the NAND memory array structure 400, e.g., access lines $202_0$-$202_N$ and control gates $236_0$-$236_N$, respectively, might collectively correspond to the voltage node 372 and the second electrode 368 of the capacitor 370, respectively, of the volatile memory cell 300. And the channels of the memory cells 208 of the NAND memory array structure 400, e.g., memory cells $208_0$-$208_N$, might collectively correspond to the first electrode 366 of the capacitor 370 of the volatile memory cell 300, connected to a source/drain region of its access transistor 364. For operation as volatile storage of data, the source select transistor 210 of the NAND memory array structure 400, e.g., one or more source select transistors 210 connected in series, might remain deactivated for the various access operations, e.g., programming, reading, and/or erasing.

Figure 5:
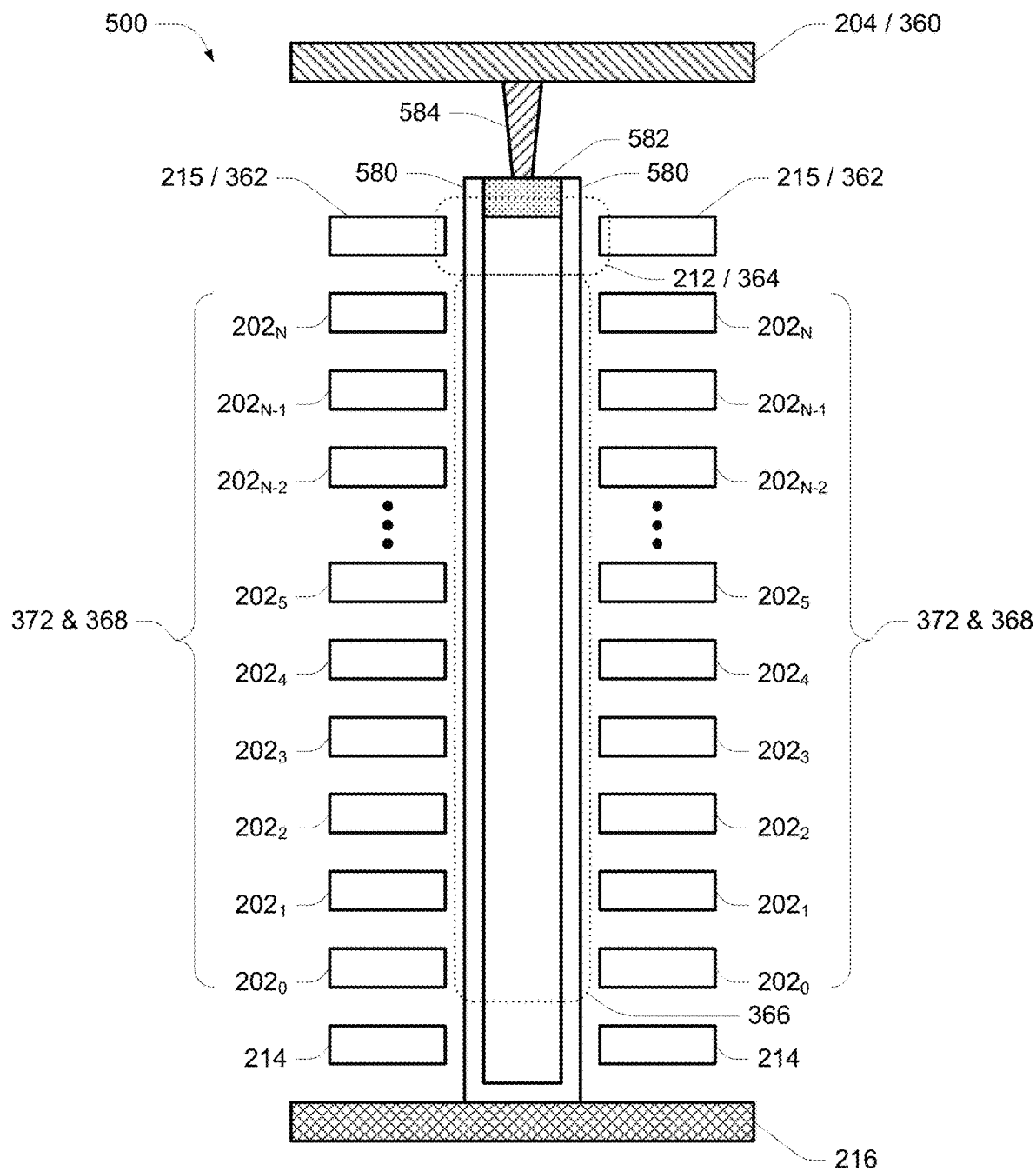
FIG. 5 is a conceptual cross-sectional view of a NAND memory array structure further demonstrating a correspondence between its components and the elements of a volatile memory cell.

FIG. 5 is a conceptual cross-sectional view of a NAND memory array structure 500 further demonstrating a correspondence between its components and the elements of a volatile memory cell. Like numbered elements in FIG. 5 correspond to the description as provided with respect to FIG. 2A and FIG. 3.

FIG. 5 depicts access lines 202, and select lines 214 and 215, formed around a channel material structure 580. The channel material structure 580 might contain a channel material, and might function as a channel of the select gate 210, the select gate 212, and each memory cell 208 of its respective NAND string 206. The channel material structure 580 might include one or more semiconductor materials. For one embodiment, the channel material structure 580 might include a silicon-containing material, such as amorphous or polycrystalline silicon. The channel material structure 580 might have a conductivity type, e.g., a p-type conductivity or an n-type conductivity, and might have sufficient conductivity to give the memory cells 208 a negative threshold voltage absent programming of their data-storage structures. Although the channel material structure 580 is depicted as a hollow structure, the channel material structure 580 could alternatively be a solid structure.

A conductive plug 582 might be formed to be in contact with the channel material structure 580. The conductive plug 582 might contain one or more conductive materials, and might comprise, consist of, or consist essentially of conductively doped polysilicon and/or might comprise, consist of, or consist essentially of metal, such as a refractory metal, or a metal-containing material, such as a refractory metal silicide or a metal nitride, e.g., a refractory metal nitride, as well as any other conductive material. For some embodiments, the conductive plug 582 might contain a conductively-doped polysilicon, such as an n+-type conductively-doped polysilicon.

A data line contact 584 might be formed to be in contact with the conductive plug 582. The data line contact 584 might contain one or more conductive materials, and might comprise, consist of, or consist essentially of conductively doped polysilicon and/or might comprise, consist of, or consist essentially of metal, such as a refractory metal, or a metal-containing material, such as a refractory metal silicide or a metal nitride, e.g., a refractory metal nitride, as well as any other conductive material. For some embodiments, the contact 584 might contain an n+-type conductively-doped polysilicon. For other embodiments, the contact 584 might include an n+-type conductively-doped polysilicon formed overlying the conductive plug 582, titanium nitride (TiN) formed overlying the n+-type conductively-doped polysilicon, and tungsten (W) formed overlying the titanium nitride.

A data line 204 might be formed to be in contact with the data line contact 584. The data line 204 might contain one or more conductive materials, and might comprise, consist of, or consist essentially of conductively doped polysilicon and/or might comprise, consist of, or consist essentially of metal, such as a refractory metal, or a metal-containing material, such as a refractory metal silicide or a metal nitride, e.g., a refractory metal nitride, as well as any other conductive material. For some embodiments, the data line 204 might contain tungsten (W).

In FIG. 5, the data line 204 of the NAND memory array structure 500 might correspond to the data line 360 of the volatile memory cell 300, connected to a source/drain region of its access transistor 364. The drain select transistor 212 of the NAND memory array structure 500, e.g., one or more drain select transistors 212 connected in series, might correspond to the access transistor 364 of the volatile memory cell 300. The drain select line 215 of the NAND memory array structure 500, or one or more respective drain select lines 215 for one or more drain select transistors 212 connected in series, might correspond to the access line 362 of the volatile memory cell 300. The access lines 202 and corresponding control gates of the NAND memory array structure 500, e.g., access lines $202_0$-$202_N$ and their corresponding control gates, respectively, might collectively correspond to the voltage node 372 and the second electrode 368 of the capacitor 370, respectively, of the volatile memory cell 300. And the channel material structure 580 of the NAND memory array structure 500 might correspond to the first electrode 366 of the capacitor 370 of the volatile memory cell 300, connected to a source/drain region of its access transistor 364. For operation as volatile storage of data, the source select transistor 210 of the NAND memory array structure 500, e.g., one or more source select transistors 210 connected in series, might remain deactivated for the various access operations, e.g., programming, reading, and/or erasing.

Figure 6:
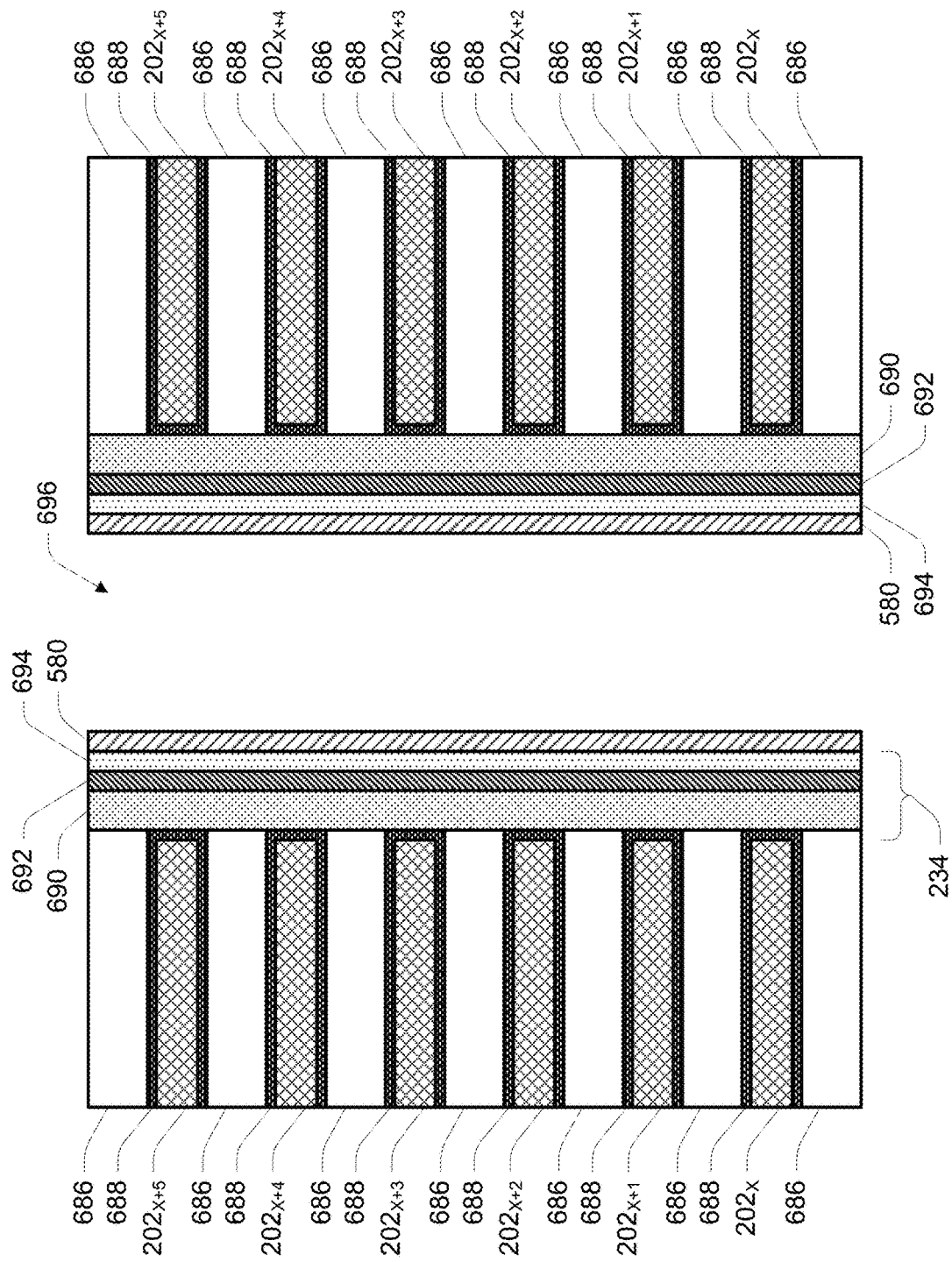
FIG. 6 is a cross-sectional view of a typical construction of a portion of the NAND memory array structure of FIG. 5.

FIG. 6 is a cross-sectional view of a typical construction of a portion of the NAND memory array structure of FIG. 5. As depicted, a charge-blocking material 690 might be formed to line a via 696 (e.g., that is surrounded by instances of the access lines 202 and intervening instances of a dielectric 686), a charge-storage material 692 might be formed on the charge-blocking material 690, a dielectric (e.g., gate dielectric) 694 might be formed on the charge-storage material 692, and the channel material structure 580 might be formed on the dielectric 694.

The charge-blocking material 690 might function as a charge-blocking node for memory cells 208 and other transistors having a same structure, and might include one or more dielectric materials. The charge-blocking material 690 might comprise, consist of, or consist essentially of an oxide, e.g., silicon dioxide ($SiO_2$), and/or might comprise, consist of, or consist essentially of a high-K dielectric material, such as aluminum oxides ($AlO_x$), hafnium oxides ($HfO_x$), hafnium aluminum oxides ($HfAlO_x$), hafnium silicon oxides ($HfSiO_x$), lanthanum oxides ($LaO_x$), tantalum oxides ($TaO_x$), zirconium oxides ($ZrO_x$), zirconium aluminum oxides ($ZrAlO_x$), or yttrium oxide ($Y_2O_3$), as well as any other dielectric material. High-K dielectrics as used herein means a material having a dielectric constant greater than that of silicon dioxide. For example, the charge-blocking material 690 might include a high-K dielectric material. An additional high-K dielectric 688 might be formed between instances of the access lines 202 and the charge-blocking material 690, and between instances of the access lines 202 and adjacent instances of the dielectric 686.

The charge-storage material 692 might contain a dielectric charge-storage material. The charge-storage material 692 might further contain both dielectric and conductive materials, e.g., conductive nano-particles in a dielectric bulk material. For charge-storage material 692 containing a dielectric material as its bulk, or as a continuous structure, resulting memory cells might typically be referred to as charge-trap memory cells. For example, the charge-storage material 692 might include silicon nitride, which has charge trapping levels inside the film.

The dielectric 694 might function as a gate dielectric for future memory cells and other transistors having a same structure, and might include one or more dielectric materials. The dielectric 694 might comprise, consist of, or consist essentially of an oxide, e.g., silicon dioxide ($SiO_2$), and/or might comprise, consist of, or consist essentially of a high-K dielectric material, such as aluminum oxides ($AlO_x$), hafnium oxides ($HfO_x$), hafnium aluminum oxides ($HfAlO_x$), hafnium silicon oxides ($HfSiO_x$), lanthanum oxides ($LaO_x$), tantalum oxides ($TaO_x$), zirconium oxides ($ZrO_x$), zirconium aluminum oxides ($ZrAlO_x$), or yttrium oxide ($Y_2O_3$), as well as any other dielectric material.

FIG. 6 depicts the dielectric structure, e.g., the dielectric 694, the charge-storage material 692, the charge-blocking material 690, and the high-K dielectric 688, isolating a first electrode of a capacitor, e.g., the channel material structure 580, and a second electrode of the capacitor, e.g., the access lines 202. This structure might approximate a container capacitor that might facilitate capacitance levels similar to, or even exceeding, that of capacitors of typical DRAM memory cells. Furthermore, as the industry trends toward higher levels of memory density, e.g., a number of memory cells per unit of die area, the capacitance of traditional DRAM memory cells might be expected to be reduced as the size of the capacitor is correspondingly reduced, thus detrimentally affecting data retention characteristics. However, increasing memory density in NAND memories tends to often involve an increase in the number of tiers, e.g., an increase in the number of access lines between a data line and a common source. As such, increases in memory density in a NAND structure such as depicted in FIGS. 5 and 6 might be expected to increase the available capacitance, which might facilitate improved data retention characteristics for volatile storage of data.

Figure 7:
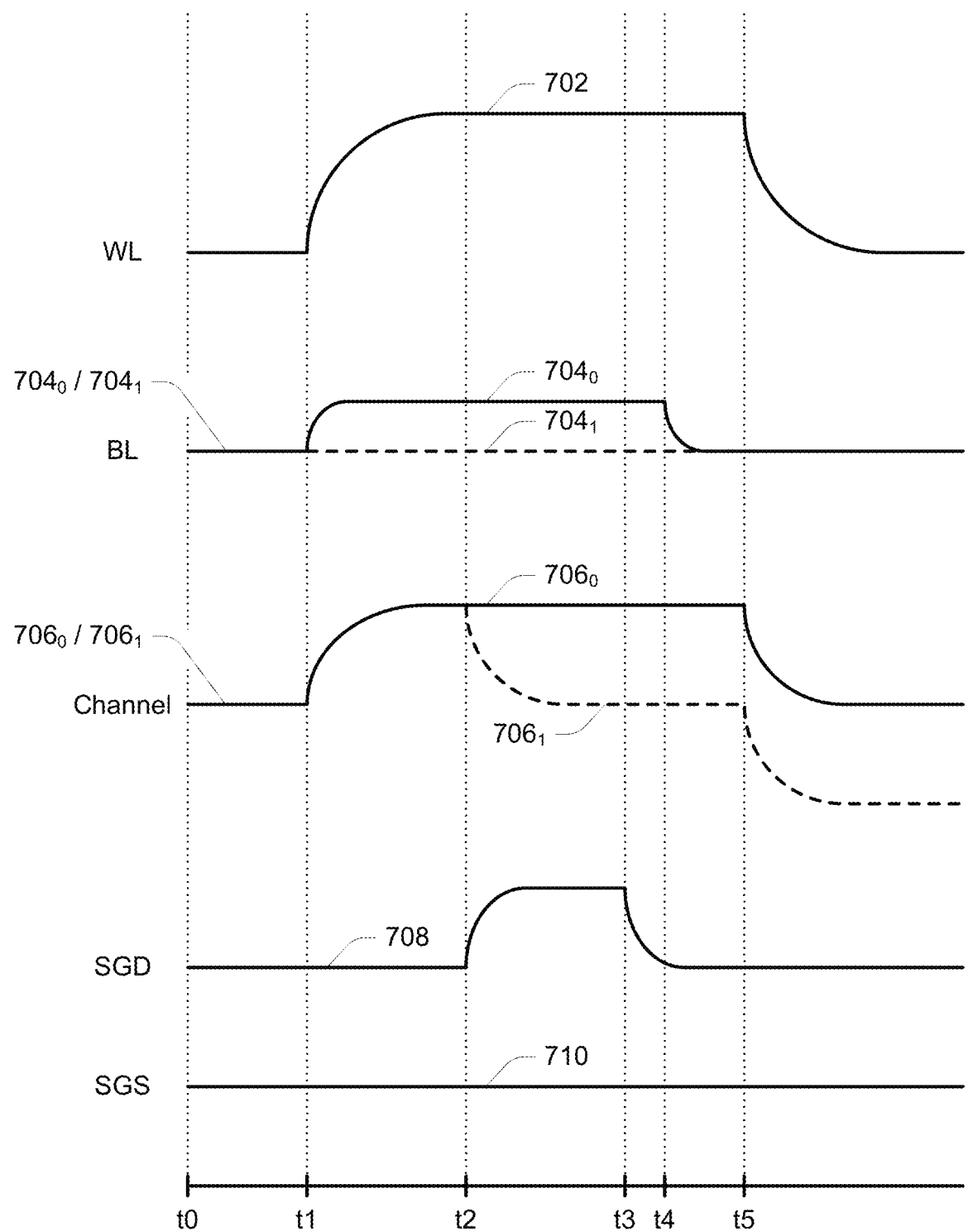
FIG. 7 is a timing diagram of a method of operating a NAND memory in accordance with an embodiment.

FIG. 7 is a timing diagram of a method of operating a NAND memory in accordance with an embodiment. For example, FIG. 7 might represent a programming operation, e.g., for volatile storage of data to a string of series-connected memory cells of the memory. The method might be in the form of computer-readable instructions, e.g., stored to the instruction registers 128. Such computer-readable instructions might be executed by a controller, e.g., the control logic 116, to cause the relevant components of the apparatus to perform the method.

In FIG. 7, trace 702 (WL) might represent a voltage level of one or more access lines 202 during the programming operation. For example, trace 702 might represent the voltage level of the access lines $202_0$-$202_N$ of FIG. 2A. Trace $704_0$ (BL) might represent a voltage level of one or more data lines 204 each selectively connected to a respective string of series-connected memory cells having a first data state as its desired data state for the programming operation, while trace $704_1$ (BL) might represent a voltage level of one or more data lines 204 each selectively connected to a respective string of series-connected memory cells having a second data state, different than the first data state, as its desired data state for the programming operation. For example, trace $704_0$ might represent the voltage level of the data line $204_0$ of FIG. 2A if the desired data state for the NAND string $206_0$ is the first data state, and trace $704_1$ might represent the voltage level of the data line $204_1$ of FIG. 2A if the desired data state for the NAND string $206_1$ is the second data state.

Trace $706_0$ (Channel) might represent a voltage level of a channel material structure 580 of a string of series-connected memory cells having the first data state as its desired data state for the programming operation, while trace $706_1$ (Channel) might represent a voltage level of a channel material structure 580 of a string of series-connected memory cells having the second data state as its desired data state for the programming operation. Continuing with the foregoing example, trace $706_0$ might represent the voltage level of the channels of the memory cells 208 of the NAND string $206_0$, and trace $706_1$ might represent the voltage level of the channels of the memory cells 208 of the NAND string $206_1$.

Trace 708 (SGD) might represent a voltage level of one or more drain select lines 215. Note that for embodiments having multiple drain select transistors 212 connected in series, where the method calls for a voltage level of trace 708 configured to activate the drain select transistor 212, each additional drain select transistor 212 might receive a voltage level to its respective select line 215 that is also configured to activate that drain select transistor 212, which might include a same or different voltage level. This guidance might similarly hold true for any additional transistors connected in series between the string of series-connected memory cells 206 and the data line 204, e.g., GIDL (gate-induced drain leakage) generator gates are often inserted between the data line 204 and the select transistors 212. In contrast, where the method calls for a voltage level of trace 708 configured to deactivate the drain select transistor 212, each additional drain select transistor 212, and any other additional transistors connected in series between the memory cells 208 and the data line 204, might receive a voltage level to its respective control gate that is also configured to deactivate that transistor, which might include a same or different voltage level. While additional cut-off might generally be preferred where the method calls for a voltage level of trace 708 configured to deactivate the drain select transistor 212, additional drain select transistors 212, and any other additional transistors connected in series between the memory cells 208 and the data line 204, might alternatively be permitted to be activated.

Trace 710 (SGS) might represent a voltage level of one or more source select lines 214. Note that for embodiments having multiple source select transistors 210 connected in series, where the method calls for a voltage level of trace 710 configured to deactivate the source select transistor 210, each additional source select transistor 210 might receive a voltage level to its respective select line 214 that is also configured to deactivate that source select transistor 210, which might include a same or different voltage level. This guidance might similarly hold true for any additional transistors connected in series between the string of series-connected memory cells 206 and the common source 216, e.g., GIDL (gate-induced source leakage) generator gates are often inserted between the common source 216 and the source select transistors 210. While additional cut-off might generally be preferred where the method calls for a voltage level of trace 710 configured to deactivate the source select transistor 210, additional source select transistors 210, and any other additional transistors connected in series between the memory cells 208 and the common source 216, might alternatively be permitted to be activated.

At time t0, traces 702, $704_0$, $704_1$, $706_0$, $706_1$, 708, and 710, might each be at a respective initial voltage level. The respective initial voltage levels might each represent a state of an electrically floating entity, e.g., disconnected or isolated from any voltage node. In addition, or in the alternative, the respective initial voltage levels might each be at a level of a reference potential, e.g., Vss, 0V, or ground. The respective initial voltage levels of traces 708 and 710 might be configured to deactivate the drain select transistors 212 and source select transistors 210, respectively.

At time t1, a first voltage level might be applied to one or more access lines 202, and the access lines 202 might reach the first voltage level at or before time t2 as indicated in trace 702. The first voltage level might be higher than a supply voltage of the memory, e.g., higher than Vcc. While higher numbers of access lines 202 receiving the first voltage level might facilitate improved differentiation between programmed data states and improved data retention characteristics due to higher resulting capacitance levels, the number of access lines 202 receiving the first voltage level does not need to be all access lines 202 of a string of series-connected memory cells. At time t1, a second voltage level might be applied to one or more data lines 204 each selectively connected to a respective string of series-connected memory cells having the first data state as its desired data state for the programming operation, and a third voltage level, e.g., lower than the second voltage level, might be applied to one or more data lines 204 each selectively connected to a respective string of series-connected memory cells having the second data state as its desired data state for the programming operation, as depicted in traces $704_0$ and $704_1$, respectively. As one example, the second voltage level might be the supply voltage Vcc, and the third voltage level might be the supply voltage Vss. Traces 708 and 710 might remain at their initial voltage levels.

As a result of the increase of the voltage level of the access lines 202 while the drain select transistors 212 and source select transistors 210 are deactivated, the voltage levels of the channels of the strings of series-connected memory cells might be boosted due to capacitive coupling, reaching a steady-state value at or before time t2. The voltage level of traces $706_0$ and $706_1$ at time t2 might be lower than the voltage level of trace 702 at time t2 due to the coupling ratio between the access lines 202 and the channel material structure 580.

At time t2, a fourth voltage level might be applied to the select line 215 as depicted in trace 708. The fourth voltage level might be configured to deactivate a drain select transistor 212 in response to its corresponding data line 204 receiving the second voltage level, and to activate a drain select transistor 212 in response to its corresponding data line 204 receiving the third voltage level. Continuing with the foregoing example, the channels of the memory cells 208 of the NAND string $206_0$ might retain their boosted voltage level as their corresponding select gate $212_0$ might be deactivated, while the boosted voltage level of the channels of the memory cells 208 of the NAND string $206_1$ might be discharged to the data line $204_1$ (e.g., to the third voltage level) as their corresponding drain select transistor $212_1$ might be activated.

At time t3, trace 708 might be returned to its initial voltage level or some other voltage level to deactivate the drain select transistors 212, thus isolating their respective strings of series-connected memory cells from their respective data lines 204. At time t4, traces $704_0$ and $704_1$ might be returned to their initial voltage levels. And at time t5, trace 702 might be returned to its initial voltage level. The various nodes might further be allowed to electrically float after discharge. The discharge of the access lines 202 as depicted by trace 702 might deboost the voltage level of the channels as depicted by traces $706_0$ and $706_1$, returning trace $706_0$ to its initial voltage level, and placing trace $706_1$ at a voltage level below its initial voltage level. For example, the channel material structure of a string of series-connected memory cells having the first data value might return to a voltage level at (or near) its initial voltage level, while the channel material structure of a string of series-connected memory cells having the second data value might decrease to a voltage level below its initial voltage level, which might include a negative voltage level. The data stored in this manner might be referred to as volatile data as removal of power from the array of memory cells would be expected to make the stored data indeterminate. For example, upon removal of power, the channel material structure of each string of series-connected memory cells might be expected to assume a condition representing the first data value, even for those strings of series-connected memory cells that had been programmed to have the second data value.

While a specific timing of events was described with reference to FIG. 7, certain events might occur prior to or after the times depicted. For example, each string of series-connected memory cells of the programming operation might be isolated from its corresponding data line and from the common source, a string of series-connected memory cells to store the first data value might then have its channel boosted and deboosted while remaining isolated from its corresponding data line and from the common source. A string of series-connected memory cells to store the second data value might have its channel boosted while remaining isolated from its corresponding data line and from the common source, then discharged to its corresponding data line while connected to its corresponding data line, and then deboosted while again isolated from its corresponding data line and from the common source. Various embodiments include any timing of the traces 702, 704, 708, and 710 that satisfy such a series of events.

Figure 8:
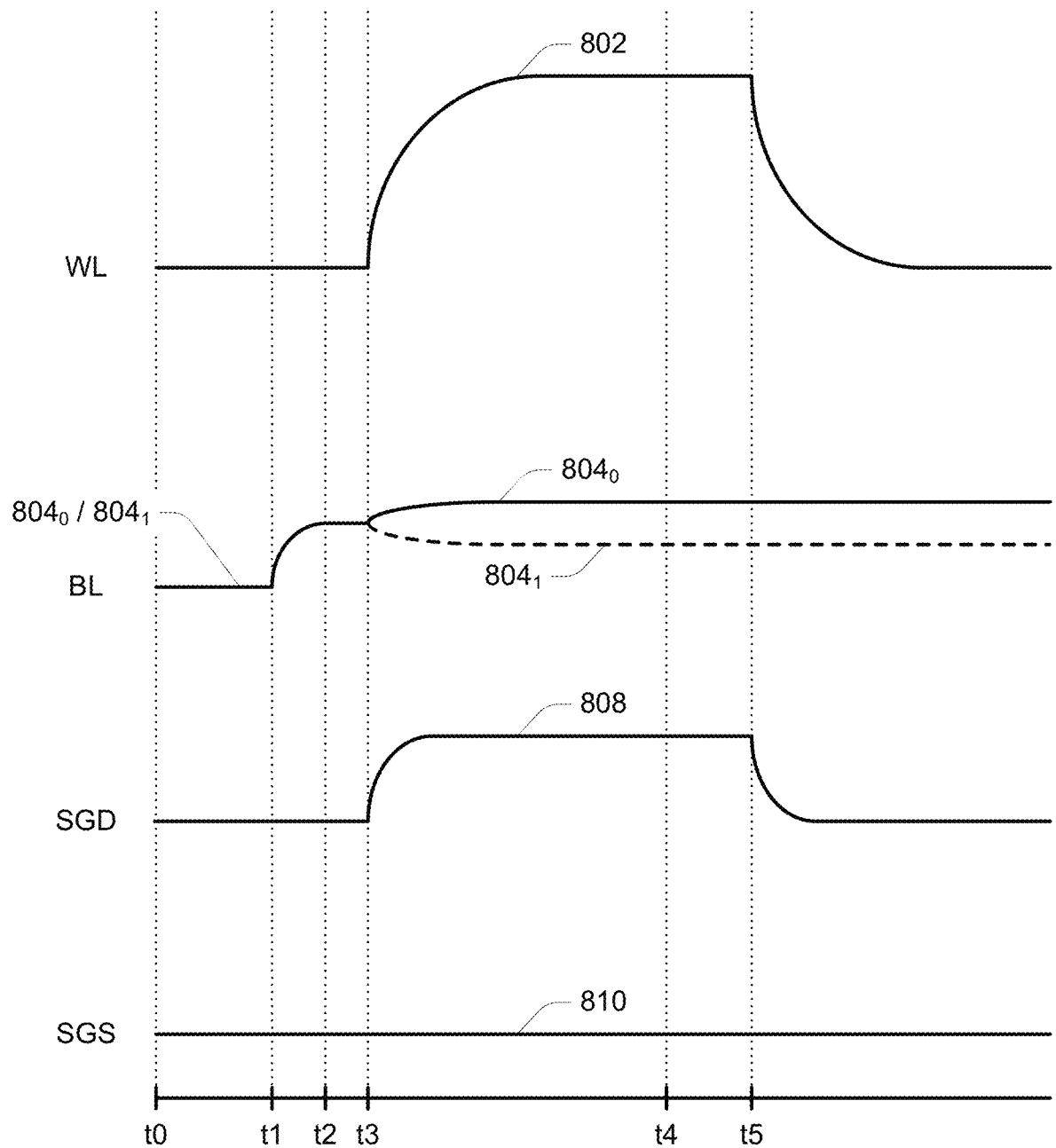
FIG. 8 is a timing diagram of a method of operating a NAND memory in accordance with another embodiment.

FIG. 8 is a timing diagram of a method of operating a NAND memory in accordance with another embodiment. For example, FIG. 8 might represent a read operation of data from a string of series-connected memory cells of the memory storing volatile data. The method might be in the form of computer-readable instructions, e.g., stored to the instruction registers 128. Such computer-readable instructions might be executed by a controller, e.g., the control logic 116, to cause the relevant components of the apparatus to perform the method. Note that the read operation might be performed as part of a periodic refresh operation in which a data value read from the string of series-connected memory cells might be reprogrammed to the string of series-connected memory cells to avoid loss of volatile data, as is done in traditional DRAM.

In FIG. 8, trace 802 (WL) might represent a voltage level of one or more access lines 202 during the read operation. For example, trace 802 might represent the voltage level of the access lines $202_0$-$202_N$ of FIG. 2A. Trace $804_0$ (BL) might represent a voltage level of one or more data lines 204 each selectively connected to a respective string of series-connected memory cells storing the first data state for the read operation, while trace $804_1$ (BL) might represent a voltage level of one or more data lines 204 each selectively connected to a respective string of series-connected memory cells storing the second data state for the read operation. Continuing with the example of FIG. 7, trace $804_0$ might represent the voltage level of the data line $204_0$ of FIG. 2A if the NAND string $206_0$ is storing the first data state, and trace $804_1$ might represent the voltage level of the data line $204_1$ of FIG. 2A if the NAND string $206_1$ is storing the second data state.

Trace 808 (SGD) might represent a voltage level of one or more drain select lines 215. Note that for embodiments having multiple drain select transistors 212 connected in series, where the method calls for a voltage level of trace 808 configured to activate the drain select transistor 212, each additional drain select transistor 212 might receive a voltage level to its respective select line 215 that is also configured to activate that drain select transistor 212, which might include a same or different voltage level. This guidance might similarly hold true for any additional transistors connected in series between the string of series-connected memory cells 206 and the data line 204, e.g., GIDL (gate-induced drain leakage) generator gates are often inserted between the data line 204 and the drain select transistors 212. In contrast, where the method calls for a voltage level of trace 808 configured to deactivate the drain select transistor 212, each additional drain select transistor 212, and any other additional transistors connected in series between the memory cells 208 and the data line 204, might receive a voltage level to its respective control gate that is also configured to deactivate that transistor, which might include a same or different voltage level. While additional cut-off might generally be preferred where the method calls for a voltage level of trace 808 configured to deactivate the drain select transistor 212, additional drain select transistors 212, and any other additional transistors connected in series between the memory cells 208 and the data line 204, might alternatively be permitted to be activated.

Trace 810 (SGS) might represent a voltage level of one or more source select lines 214. Note that for embodiments having multiple source select transistors 210 connected in series, where the method calls for a voltage level of trace 810 configured to deactivate the select transistor 210, each additional source select transistor 210 might receive a voltage level to its respective select line 214 that is also configured to deactivate that source select transistor 210, which might include a same or different voltage level. This guidance might similarly hold true for any additional transistors connected in series between the string of series-connected memory cells 206 and the common source 216, e.g., GIDL generator gates are often inserted between the common source 216 and the source select transistors 210. While additional cut-off might generally be preferred where the method calls for a voltage level of trace 810 configured to deactivate the source select transistor 210, additional source select transistors 210, and any other additional transistors connected in series between the memory cells 208 and the common source 216, might alternatively be permitted to be activated.

At time t0, traces 802, $804_0$, $804_1$, 808, and 810, might each be at a respective initial voltage level. The respective initial voltage levels might each represent a state of an electrically floating entity, e.g., disconnected or isolated from any voltage node. In addition, or in the alternative, the respective initial voltage levels might each be at a level of a reference potential, e.g., Vss, 0V, or ground. The respective initial voltage levels of traces 808 and 810 might be configured to deactivate the drain select transistors 212 and source select transistors 210, respectively.

At time t1, a first voltage level might be applied to one or more data lines 204, and the data lines 204 might reach the first voltage level at or before time t2 as indicated in traces $804_0$ and $804_1$. Although the first voltage level of traces $804_0$ and $804_1$ is depicted to be different than (e.g., higher than) their initial voltage levels, the first voltage level might alternatively remain at the initial voltage level.

At time t3, a second voltage level might be applied to one or more access lines 202 as indicated in trace 802. As one example, the second voltage level of FIG. 8 might be substantially equal to (e.g., equal to) the first voltage level used for programming the data values, e.g., as described with reference to FIG. 7. Alternatively, for embodiments storing more than two possible data states to the NAND strings, the second voltage level of FIG. 8 might be substantially equal to (e.g., equal to) the fifth voltage level used for programming the additional data values, e.g., as described with reference to FIG. 10. At time t3, a third voltage level might be applied to the select line 215 as indicated in trace 808. The third voltage level might be configured to activate the drain select transistors 212.

As a result, each string of series-connected memory cells corresponding to the activated drain select transistors 212 might be connected to their respective data lines 204, and charge sharing might occur between the channel material structures of the strings of series-connected memory cells and their corresponding data lines 204. The channel material structure of a string of series-connected memory cells storing the first data value might tend to increase the voltage level of its corresponding data line, resulting in a voltage increase of trace $804_0$. The channel material structure of a string of series-connected memory cells storing the second data value might tend to decrease the voltage level of its corresponding data line, resulting in a voltage decrease of trace $804_1$.

At time t4, the respective voltage levels of the data lines might be sensed in any of a number of manners well understood in the field of integrated circuit memory devices. For example, a differential sense circuit receiving a reference voltage level, e.g., the first voltage level applied to each data line 204, at a first input and the voltage level of a respective data line 204 at a second input might be used to determine whether the voltage level of that data line 204 had increased or decreased. Alternatively, for single-ended sensing, a data line 204 could be connected to the control gate of a sense transistor having a threshold voltage at or near the first voltage level applied to each data line 204. In this manner, the voltage level of that data line 204 might be deemed to have decreased if the transistor is deactivated at time t4, and might be deemed to have increased if the transistor is activated at time t4. Any other manners of determining whether the voltage level of a data line 204 had increased or decreased after charge sharing with a string of series-connected memory cells might be used to determine the stored data state.

For some embodiments, where the first voltage level is the initial voltage level, e.g., the reference potential, the trace $804_1$ might not decrease, but might instead remain at the reference potential. For such embodiments, the trace $804_0$ might be expected to exhibit a larger increase, and a reference voltage level for a differential sense circuit, or a threshold voltage of a sense transistor for a single-ended sense circuit, might be selected to be higher than the reference potential and lower than an expected voltage level of the trace $804_0$ at time t4.

At time t5, trace 808 might be returned to its initial voltage level or some other voltage level to deactivate the drain select transistors 212, thus isolating their respective strings of series-connected memory cells from their respective data lines 204. At time t5, trace 802 might be returned to its initial voltage level. The various nodes might further be allowed to electrically float after discharge. While a specific timing of events was described with reference to FIG. 8, certain events might occur prior to or after the times depicted. For example, each string of series-connected memory cells of the read operation might be isolated from its corresponding data line and from the common source, each string of series-connected memory cells of the read operation might then be connected to its corresponding data line while remaining isolated from the common source, and a data state of each string of series-connected memory cells of the read operation might be determined in response to a change in voltage level, or lack of change in voltage level, of their corresponding data lines. Various embodiments include any timing of the traces 802, 804, 808, and 810 that satisfy such a series of events.

Figure 9:
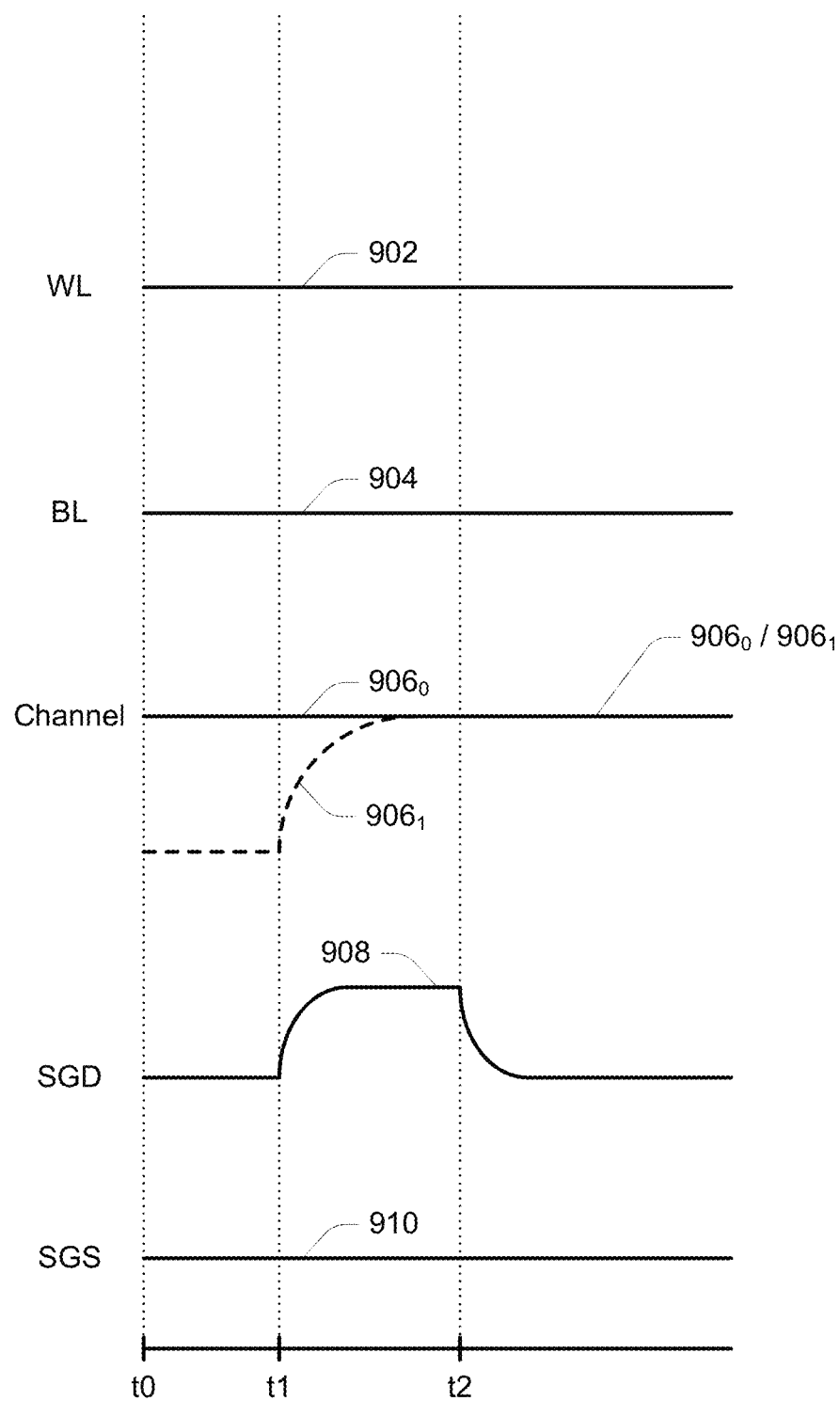
FIG. 9 is a timing diagram of a method of operating a NAND memory in accordance with a further embodiment.

FIG. 9 is a timing diagram of a method of operating a NAND memory in accordance with a further embodiment. For example, FIG. 9 might represent an erase operation, e.g., to clear volatile data from a string of series-connected memory cells of the memory. The method might be in the form of computer-readable instructions, e.g., stored to the instruction registers 128. Such computer-readable instructions might be executed by a controller, e.g., the control logic 116, to cause the relevant components of the apparatus to perform the method.

In FIG. 9, trace 902 (WL) might represent a voltage level of one or more access lines 202 during the erase operation. For example, trace 902 might represent the voltage level of the access lines $202_0$-$202_N$ of FIG. 2A. Trace 904 (BL) might represent a voltage level of one or more data lines 204 each selectively connected to a respective string of series-connected memory cells for the erase operation. For example, trace 904 might represent the voltage level of the data line 204 of FIG. 2A.

Trace $906_0$ (Channel) might represent a voltage level of a channel material structure 580 of a string of series-connected memory cells storing the first data state prior to the erase operation, while trace $906_1$ (Channel) might represent a voltage level of a channel material structure 580 of a string of series-connected memory cells storing the second data state prior to the erase operation.

Trace 908 (SGD) might represent a voltage level of one or more drain select lines 215. Note that for embodiments having multiple drain select transistors 212 connected in series, where the method calls for a voltage level of trace 908 configured to activate the drain select transistor 212, each additional drain select transistor 212 might receive a voltage level to its respective select line 215 that is also configured to activate that drain select transistor 212, which might include a same or different voltage level. This guidance might similarly hold true for any additional transistors connected in series between the string of series-connected memory cells 206 and the data line 204, e.g., GIDL (gate-induced drain leakage) generator gates are often inserted between the data line 204 and the drain select transistors 212. In contrast, where the method calls for a voltage level of trace 908 configured to deactivate the drain select transistor 212, each additional drain select transistor 212, and any other additional transistors connected in series between the memory cells 208 and the data line 204, might receive a voltage level to its respective control gate that is also configured to deactivate that transistor, which might include a same or different voltage level. While additional cut-off might generally be preferred where the method calls for a voltage level of trace 908 configured to deactivate the drain select transistor 212, additional drain select transistors 212, and any other additional transistors connected in series between the memory cells 208 and the data line 204, might alternatively be permitted to be activated.

Trace 910 (SGS) might represent a voltage level of one or more source select lines 214. Note that for embodiments having multiple source select transistors 210 connected in series, where the method calls for a voltage level of trace 910 configured to deactivate the select transistor 210, each additional source select transistor 210 might receive a voltage level to its respective select line 214 that is also configured to deactivate that source select transistor 210, which might include a same or different voltage level. This guidance might similarly hold true for any additional transistors connected in series between the string of series-connected memory cells 206 and the common source 216, e.g., GIDL generator gates are often inserted between the common source 216 and the source select transistors 210. While additional cut-off might generally be preferred where the method calls for a voltage level of trace 910 configured to deactivate the source select transistor 210, additional source select transistors 210, and any other additional transistors connected in series between the memory cells 208 and the common source 216, might alternatively be permitted to be activated.

At time t0, traces 902, 904, $906_0$, $906_1$, 908, and 910, might each be at a respective initial voltage level. The respective initial voltage levels might each represent a state of an electrically floating entity, e.g., disconnected or isolated from any voltage node. The respective initial voltage levels of traces 908 and 910 might be configured to deactivate the drain select transistors 212 and source select transistors 210, respectively.

At time t1, a first voltage level might be applied to one or more access lines 202 configured to activate their corresponding memory cells 208. For memory cells 208 having a negative threshold voltage, the first voltage level might be the initial voltage level of the access lines 202. For example, the first voltage level might be the reference potential. At time t1, a second voltage level might be applied to one or more select lines 215 as indicated in trace 908. The second voltage level might be configured to activate the drain select transistors 212. Traces 904 and 910 might remain at their initial voltage levels.

As a result of the activation of the memory cells 208 while the drain select transistors 212 are activated and the source select transistors 210 are deactivated, the channels of the strings of series-connected memory cells might be connected to their respective data lines 204 and might thus each equilibrate to the voltage level of their respective data line 204.

At time t2, trace 908 might be returned to its initial voltage level or some other voltage level to deactivate the drain select transistors 212, thus isolating their respective strings of series-connected memory cells from their respective data lines 204. While a specific timing of events was described with reference to FIG. 9, certain events might occur prior to or after the times depicted. For example, each string of series-connected memory cells of the erase operation might be isolated from its corresponding data line and from the common source, and the memory cells of each string of series-connected memory cells of the erase operation might be activated while their corresponding drain select transistors 212 are activated, thereby connecting their channels to their respective data lines. Various embodiments include any timing of the traces 902, 904, 908, and 910 that satisfy such a series of events.

Figure 10:
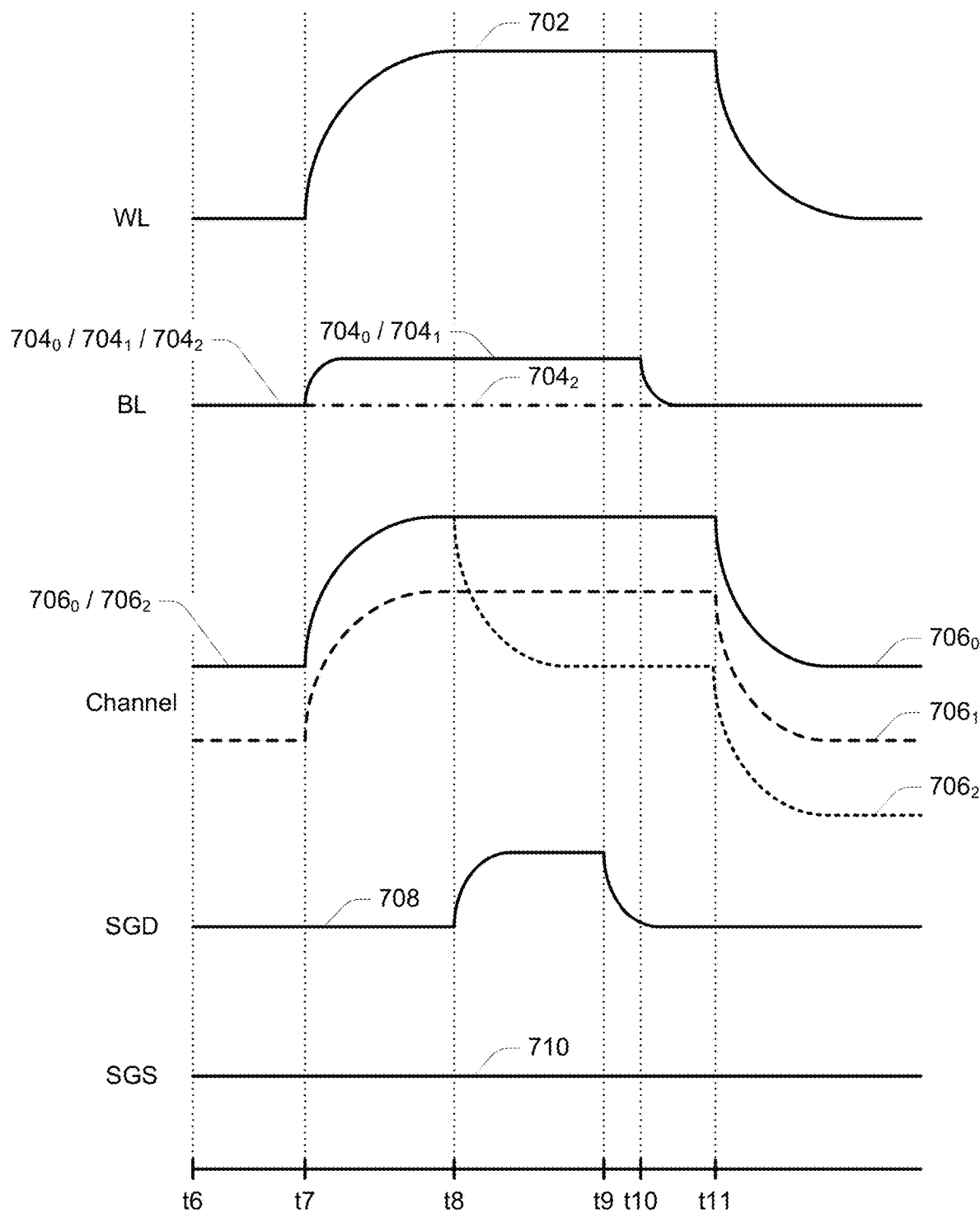
FIG. 10 is a timing diagram of a method of operating a NAND memory expanding on the embodiment of FIG. 7.

FIG. 10 is a timing diagram of a method of operating a NAND memory expanding on the embodiment of FIG. 7. For example, FIG. 10 might represent a programming operation such as depicted in FIG. 7, e.g., for volatile storage of more than one digit of data to a string of series-connected memory cells of the memory. The method might be in the form of computer-readable instructions, e.g., stored to the instruction registers 128. Such computer-readable instructions might be executed by a controller, e.g., the control logic 116, to cause the relevant components of the apparatus to perform the method.

The example of FIG. 10 depicts a method of facilitating more than two data states to be stored to a string of series-connected memory cells. In this manner, more than one digit (e.g., bit) of data might be stored to each string of series-connected memory cells. For example, if each string of series-connected memory cells can be programmed to store one of three data states, two strings of series-connected memory cells might be used to collectively represent three digits of data, or 1.5 digits per string of series-connected memory cells. If each string of series-connected memory cells can be programmed to store one of four data states, a string of series-connected memory cells might represent two digits of data, and so on.

Like numbered elements in FIG. 10 correspond to the description as provided with respect to FIG. 7. In addition, in FIG. 10, trace $704_2$ (BL) might represent a voltage level of one or more data lines 204 each selectively connected to a respective string of series-connected memory cells having a third data state, different than the first data state and the second data state, as its desired data state for the programming operation. For example, trace $704_0$ might represent the voltage level of the data line $204_0$ of FIG. 2A if the desired data state for the NAND string $206_0$ is the first data state, trace $704_1$ might represent the voltage level of the data line $204_1$ of FIG. 2A if the desired data state for the NAND string $206_1$ is the second data state, and trace $704_2$ might represent the voltage level of the data line $204_2$ of FIG. 2A if the desired data state for the NAND string $206_2$ is the third data state. Trace $706_2$ (Channel) might represent a voltage level of a channel material structure 580 of a string of series-connected memory cells having the third data state as its desired data state for the programming operation. Continuing with the foregoing example, trace $706_0$ might represent the voltage level of the channels of the memory cells 208 of the NAND string $206_0$, trace $706_1$ might represent the voltage level of the channels of the memory cells 208 of the NAND string $206_1$, and trace $706_2$ might represent the voltage level of the channels of the memory cells 208 of the NAND string $206_2$.

FIG. 10 presumes that the method of FIG. 7 is first performed, and thus begins at time t6, e.g., after the various nodes have been discharged. Strings of series-connected memory cells having the third data state as their desired data state might be treated as if their desired data state was the first data state for times t0 to t5 of FIG. 7.

At time t6, traces 702, $704_0$, $704_1$, $704_2$, $706_0$, $706_1$, $706_2$, 708, and 710, might each be at a respective initial voltage level. The respective initial voltage levels might each represent a state of an electrically floating entity, e.g., disconnected or isolated from any voltage node. The respective initial voltage levels of traces 708 and 710 might be configured to deactivate the drain select transistors 212 and source select transistors 210, respectively.

At time t7, a fifth voltage level, lower than the first voltage level and higher than the initial voltage level of the access lines 202 might be applied to one or more access lines 202, and the access lines 202 might reach the fifth voltage level at or before time t8 as indicated in trace 702. The fifth voltage level might be different than the first voltage level. While higher numbers of access lines 202 receiving the fifth voltage level might facilitate improved differentiation between programmed data states and improved data retention characteristics due to higher resulting capacitance levels, the number of access lines 202 receiving the fifth voltage level does not need to be all access lines 202 of a string of series-connected memory cells. At time t7, the second voltage level might be applied to one or more data lines 204 each selectively connected to a respective string of series-connected memory cells having the first data state or the second data state as its desired data state for the programming operation, and the third voltage level might be applied to one or more data lines 204 each selectively connected to a respective string of series-connected memory cells having the third data state as its desired data state for the programming operation, as depicted in traces $704_0$, $704_1$, and $704_2$, respectively.

As a result of the increase of the voltage level of the access lines 202 between times t7 and t8 while the drain select transistors 212 and source select transistors 210 are deactivated, the voltage level of the channels of the strings of series-connected memory cells might be boosted due to capacitive coupling, reaching a steady-state value at or before time t8. The voltage level of traces $706_0$ and $706_2$ at time t8 might be higher than the voltage level of trace $706_0$ at time t2 due to the higher voltage level applied to the access lines 202 at time 8 versus the voltage level applied to the access lines 202 at time t2.

At time t8, the fourth voltage level might be applied to the select line 215 as depicted in trace 708. Continuing with the foregoing example, the channels of the memory cells 208 of the NAND string $206_0$ and the NAND string $206_1$ might remain at their boosted voltage levels as their corresponding select gates $212_0$ and $212_1$, respectively, might be deactivated, while the channels of the memory cells 208 of the NAND string $206_2$ might be discharged to the data line $204_2$ (e.g., to the third voltage level) as their corresponding select gate $212_2$ might be activated.

At time t9, trace 708 might be returned to its initial voltage level or some other voltage level to deactivate the drain select transistors 212, thus isolating their respective strings of series-connected memory cells from their respective data lines 204. At time t10, traces $704_0$ and $704_1$ might be returned to their initial voltage levels. And at time t11, trace 702 might be returned to its initial voltage level. The various nodes might further be allowed to electrically float after discharge. The discharge of the access lines 202 as depicted by trace 702 might deboost the voltage level of the channels as depicted by traces $706_0$, $706_1$, and $706_2$, returning trace $706_0$ to its initial voltage level, and placing traces $706_1$ and $706_2$ at voltage levels below their initial voltage levels. For example, the channel material structure of a string of series-connected memory cells having the first data value might return to a voltage level at (or near) its initial voltage level (e.g., at time t0 of FIG. 7), while the channel material structure of a string of series-connected memory cells having the second data value or the third data value might decrease to voltage levels below their initial voltage levels, which might include negative voltage levels. Note that while the example of FIG. 10 might be depicted to utilize a fifth voltage level that is higher than the first voltage level of FIG. 7, resulting in trace $706_2$ being lower than trace $706_1$ at time t9, a fifth voltage level that is lower than the first voltage level would likewise facilitate different resulting channel voltage levels for the different data states.

While a specific timing of events was described with reference to FIG. 10, certain events might occur prior to or after the times depicted. For example, each string of series-connected memory cells of the programming operation might be isolated from its corresponding data line and from the common source, a string of series-connected memory cells to store the first data value or the second value might then have its channel boosted and deboosted while remaining isolated from its corresponding data line and from the common source, and a string of series-connected memory cells to store the third data value might have its channel boosted while remaining isolated from its corresponding data line and from the common source, then discharged to its corresponding data line while connected to its corresponding data line, and then deboosted while again isolated from its corresponding data line and from the common source. Various embodiments include any timing of the traces 702, 704, 708, and 710 that satisfy such a series of events.

Figure 11:
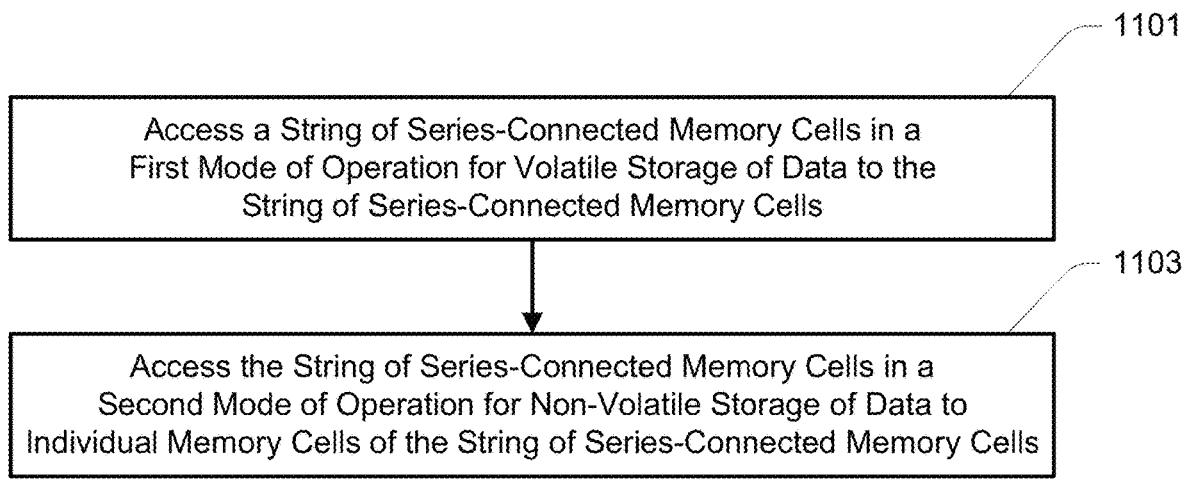
FIG. 11 is a flowchart of a method of operating a NAND memory in accordance with an embodiment.

FIG. 11 is a flowchart of a method of operating a NAND memory in accordance with an embodiment. The method might represent actions associated with an access operation, e.g., a programming operation, a read operation, or an erase operation. The method might be in the form of computer-readable instructions, e.g., stored to the instruction registers 128. Such computer-readable instructions might be executed by a controller, e.g., the control logic 116, to cause the relevant components of the apparatus to perform the method.

At 1101, a first string of series-connected memory cells might be accessed in a first mode of operation for volatile storage of data to the first string of series-connected memory cells. For example, a NAND string 206 might be accessed during a programming operation such as described with reference to FIGS. 7, 10, 12, and/or 13, during a read operation such as described with reference to FIGS. 8 and/or 14, or during an erase operation such as described with reference to FIGS. 9 and/or 15. At 1103, a second string of series-connected memory cells might be accessed in a second mode of operation for non-volatile storage of data to individual memory cells of the second string of series-connected memory cells. For example, a NAND string 206 might be accessed during a standard programming operation for non-volatile storage of data, during a standard read operation for non-volatile storage of data, or during a standard erase operation for non-volatile storage of data. For some embodiments, e.g., those utilizing strings of series-connected memory cells for volatile storage of data that are deemed to be defective for non-volatile storage of data, the methods might further include prohibiting access of the first string of series-connected memory cells in the second mode of operation for non-volatile storage of data to individual memory cells of the first string of series-connected memory cells.

A standard programming operation for non-volatile storage of data might involve applying a voltage differential across the data-storage structure of a target memory cell of a string of series-connected memory cells configured to accumulate charge (e.g., electrons) in the data-storage structure indicative of a data state of the target memory cell. This is typically done in an iterative manner, with a programming pulse applied to the control gate of the memory cell followed by a verify operation to determine whether the memory cell has attained the desired data state, and then repeated until the verify operation is deemed to pass or the programming operation is deemed to fail. Data stored in this manner might be referred to as non-volatile data as such data stored to the array of memory cells would be expected to be determinate (which might include the use of error correction) without power for time periods that are orders of magnitude greater than a time period for which volatile data might be expected to be determinate without power.

A standard read operation for non-volatile storage of data might involve applying a sense voltage level to a control gate of a target memory cell of a string of series-connected memory cells configured to activate the target memory cell if its threshold voltage is lower than a particular voltage level corresponding to a particular data state, and deactivate the target memory cell if its threshold voltage is higher than the particular voltage level, and applying a pass voltage level to control gates of each remaining memory cell of the string of series-connected memory cells configured to activate those remaining memory cells regardless of their data states. The activation or deactivation of the target memory cell could then be determined in response to a voltage level change of a data line connected to the target memory cell resulting from current flow through the target memory cell between the data line and a common source, thus indicating whether the memory cell has a data state lower than the particular data state, or higher than or equal to the particular data state. For arrays of memory cell storing multiple digits of non-volatile data to each memory cell, the memory cell might be read multiple times to determine the data state of its non-volatile data. Alternatively, multiple sense voltages might be applied to the control gate of the memory cell in an order of increasing voltage level, and its data state might be determined in response to the first sense voltage causing activation of the memory cell.

A standard erase operation for non-volatile storage of data might involve applying a voltage differential across the data-storage structure of a target memory cell of a string of series-connected memory cells configured to remove charge (e.g. electrons) from the data-storage structure, and thus remove the volatile data.

Figure 12:
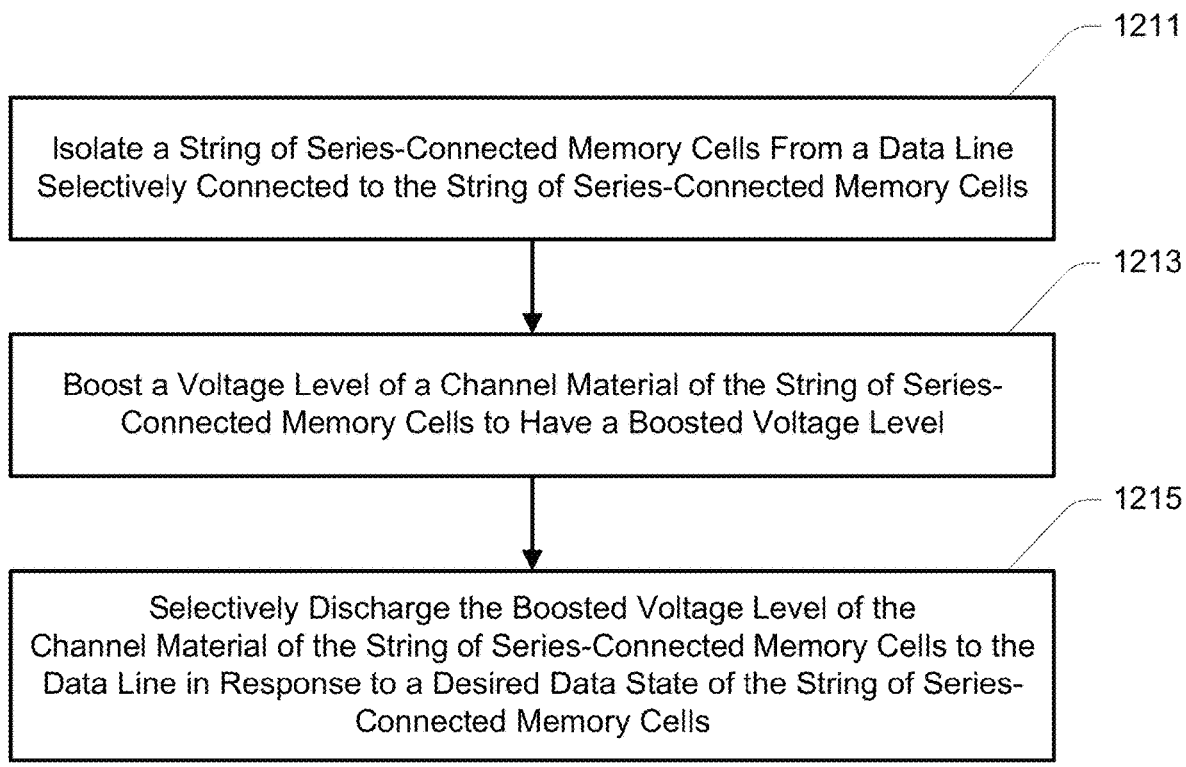
FIG. 12 is a flowchart of a method of operating a NAND memory in accordance with another embodiment.

FIG. 12 is a flowchart of a method of operating a NAND memory in accordance with another embodiment. The method might represent actions associated with an access operation, e.g., a programming operation. The method might be in the form of computer-readable instructions, e.g., stored to the instruction registers 128. Such computer-readable instructions might be executed by a controller, e.g., the control logic 116, to cause the relevant components of the apparatus to perform the method.

At 1211, a string of series-connected memory cells might be isolated from a data line selectively connected to the string of series-connected memory cells. This might correspond to time period t0-t1 of FIG. 7 or time period t6-t7 of FIG. 10. For example, one or more drain select transistors connected between the data line and the string of series-connected memory cells might be deactivated. The string of series-connected memory cells might further be isolated from a common source selectively connected to the string of series-connected memory cells. For example, one or more source select transistors connected between the common source and the string of series-connected memory cells might be deactivated.

At 1213, a voltage level of a channel material of the string of series-connected memory cells might be boosted, e.g., by capacitive coupling, to have a boosted voltage level. For example, each access line of a plurality of access lines might be connected to a control gate of a respective memory cell of the string of series-connected memory cells, and a first voltage level might be applied to the control gates of the string of series-connected memory cells to boost the voltage level of the channel material. This might correspond to time period t1-t2 of FIG. 7 or time period t7-t8 of FIG. 10. The first voltage level might be selected to boost the channel material to a voltage level corresponding to a particular data state, of a plurality of different data states, for the string of series-connected memory cells. As noted with respect to FIG. 10, different levels of boosting can be used to define different possible data states for the string of series-connected memory cells. While improvements might be expected in applying the first voltage level to each access line connected to a memory cell of the string of series-connected memory cells, such is not required.

At 1215, the boosted voltage level of the channel material of the string of series-connected memory cells might be selectively discharged to the data line in response to a desired data state of the string of series-connected memory cells. This might correspond to time period t2-t3 of FIG. 7 or time period t8-t9 of FIG. 10. For example, if the desired data state is the particular data state, the boosted voltage level of the channel material of the string of series-connected memory cells might be discharged to the data line, and if the desired data state is other than the particular data state, the string of series-connected memory cells might remain isolated from the data line to retain its boosted voltage level. Continuing with the foregoing example, the data line might receive an enable voltage level if the desired data state of the string of series-connected memory cells is the particular data state, and might receive an inhibit voltage level if the desired data state of the string of series-connected memory cells is other than the particular data state. Select lines corresponding to the one or more drain select transistors might then receive a voltage level configured to activate the one or more drain select transistors in response to the data line receiving the enable voltage level, and to deactivate the one or more drain select transistors in response to the data line receiving the inhibit voltage level. The string of series-connected memory cells might remain isolated from the common source. Note that no verify operation need be performed.

Figure 13:
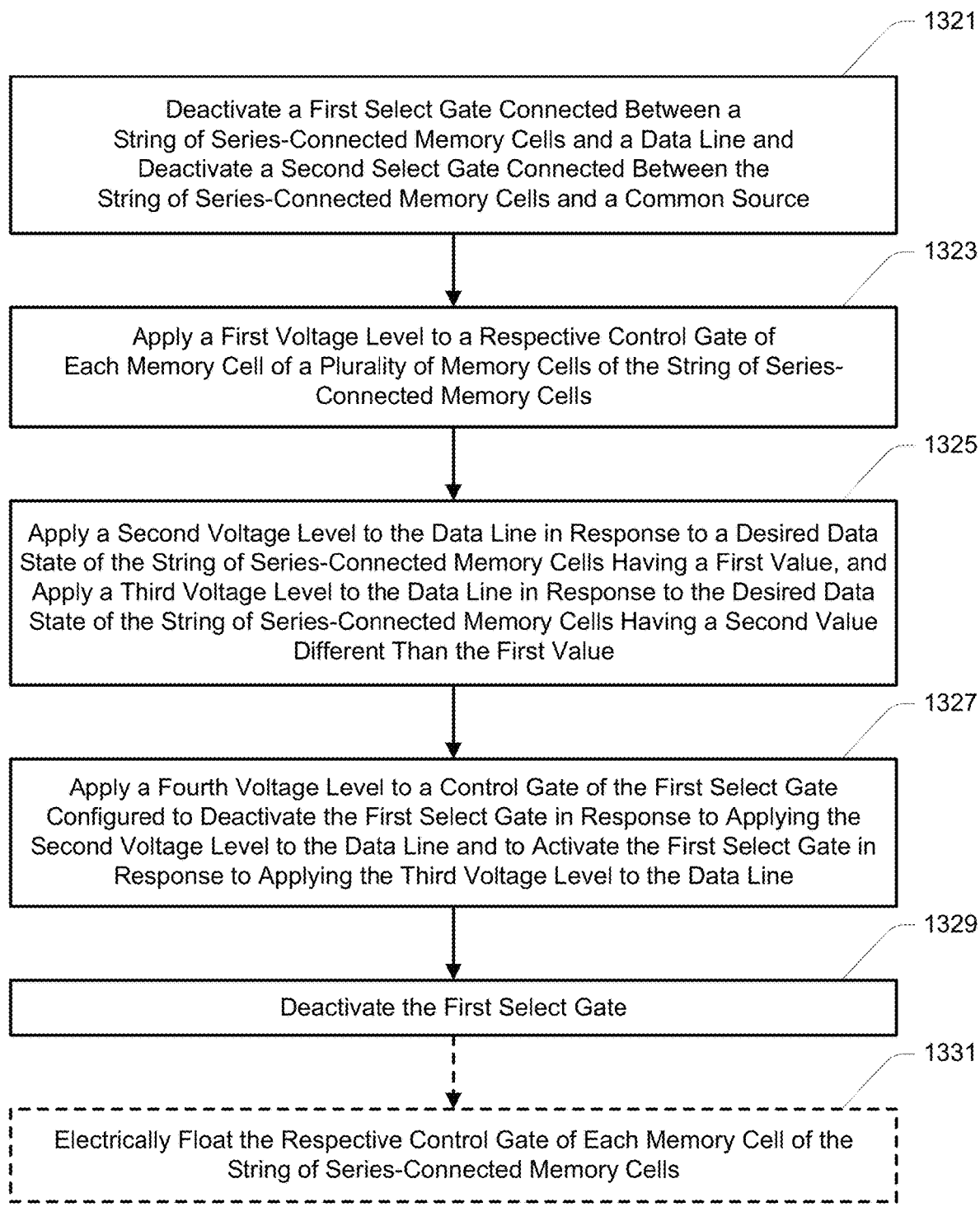
FIG. 13 is a flowchart of a method of operating a NAND memory in accordance with a further embodiment.

FIG. 13 is a flowchart of a method of operating a NAND memory in accordance with a further embodiment. The method might represent actions associated with an access operation, e.g., a programming operation. The method might be in the form of computer-readable instructions, e.g., stored to the instruction registers 128. Such computer-readable instructions might be executed by a controller, e.g., the control logic 116, to cause the relevant components of the apparatus to perform the method.

At 1321, a first select gate connected between a string of series-connected memory cells and a data line might be deactivated, and a second select gate connected between the string of series-connected memory cells and a common source might be deactivated. This might correspond to time period t0-t1 of FIG. 7 or time period t6-t7 of FIG. 10. For example, one or more drain select transistors connected between the data line and the string of series-connected memory cells might be deactivated, and one or more source select transistors connected between the common source and the string of series-connected memory cells might be deactivated. Deactivation of a drain select transistor might include applying a voltage level to the control gate of the drain select transistor configured to deactivate the drain select transistor regardless of a voltage level of the data line. Deactivation of a source select transistor might include applying a voltage level to the control gate of the source select transistor configured to deactivate the source select transistor regardless of a voltage level of the common source.

At 1323, a first voltage level might be applied to a respective control gate of each memory cell of a plurality of memory cells of the string of series-connected memory cells. This might correspond to time period t1-t2 of FIG. 7 or time period t7-t8 of FIG. 10. The first voltage level might be selected to boost the channel material to a voltage level corresponding to a particular data state, of a plurality of different data states, for the string of series-connected memory cells. As noted with respect to FIG. 10, different levels of boosting can be used to define more than two different possible data states for the string of series-connected memory cells. While improvements might be expected in applying the first voltage level to each memory cell of the string of series-connected memory cells, such is not required. The plurality of memory cells might include a majority of the memory cells of the string of series-connected memory cells, which can include all, or less than all, of the memory cells of the string of series-connected memory cells.

At 1325, a second voltage level might be applied to the data line in response to a desired data state of the string of series-connected memory cells having a first value, and a third voltage level different than the second voltage level might be applied to the data line in response to the desired data state of the string of series-connected memory cells having a second value different than the first value. This might correspond to time period t1-t2 of FIG. 7 or time period t7-t8 of FIG. 10. For example, an inhibit voltage level, e.g., second voltage level, might be applied to the data line in response to the desired data state of the string of series-connected memory cells having the first value, and an enable voltage level, e.g., third voltage level, might be applied to the data line in response to the desired data state of the string of series-connected memory cells having the second value. For embodiments such as described with reference to FIG. 10, the second voltage level might further be applied to the data line in response to the desired data state of the string of series-connected memory cells having a third data value different than the first value and different than the second value. The second voltage level might be higher than the third voltage level.

At 1327, a fourth voltage level might be applied to the first select gate configured to deactivate the first select gate in response to applying the second voltage level to the data line and to activate the first select gate in response to applying the third voltage level to the data line. This might correspond to time period t2-t3 of FIG. 7 or time period t8-t9 of FIG. 10. For example, a voltage level might be applied to the control gate of a drain select transistor such that a difference between the control gate voltage and the data line voltage is lower than a threshold voltage of the drain select transistor while the data line receives the second voltage level, and a difference between the control gate voltage and the data line voltage is higher than the threshold voltage of the drain select transistor while the data line receives the third voltage level.

At 1329, the first select gate might be deactivated. This might correspond to time period t3-t4 of FIG. 7 or time period t9-t10 of FIG. 10. For example, the one or more drain select transistors connected between the data line and the string of series-connected memory cells might be deactivated.

At 1331, the respective control gate of each memory cell of the string of series-connected memory cells might optionally be electrically floated. This might correspond to the time period of time t5 and beyond of FIG. 7 or the time period of time t11 and beyond of FIG. 10. For embodiments using a first voltage level higher than the reference potential, the respective control gate of each memory cell of the string of series-connected memory cells might optionally be discharged prior to electrically floating.

Figure 14:
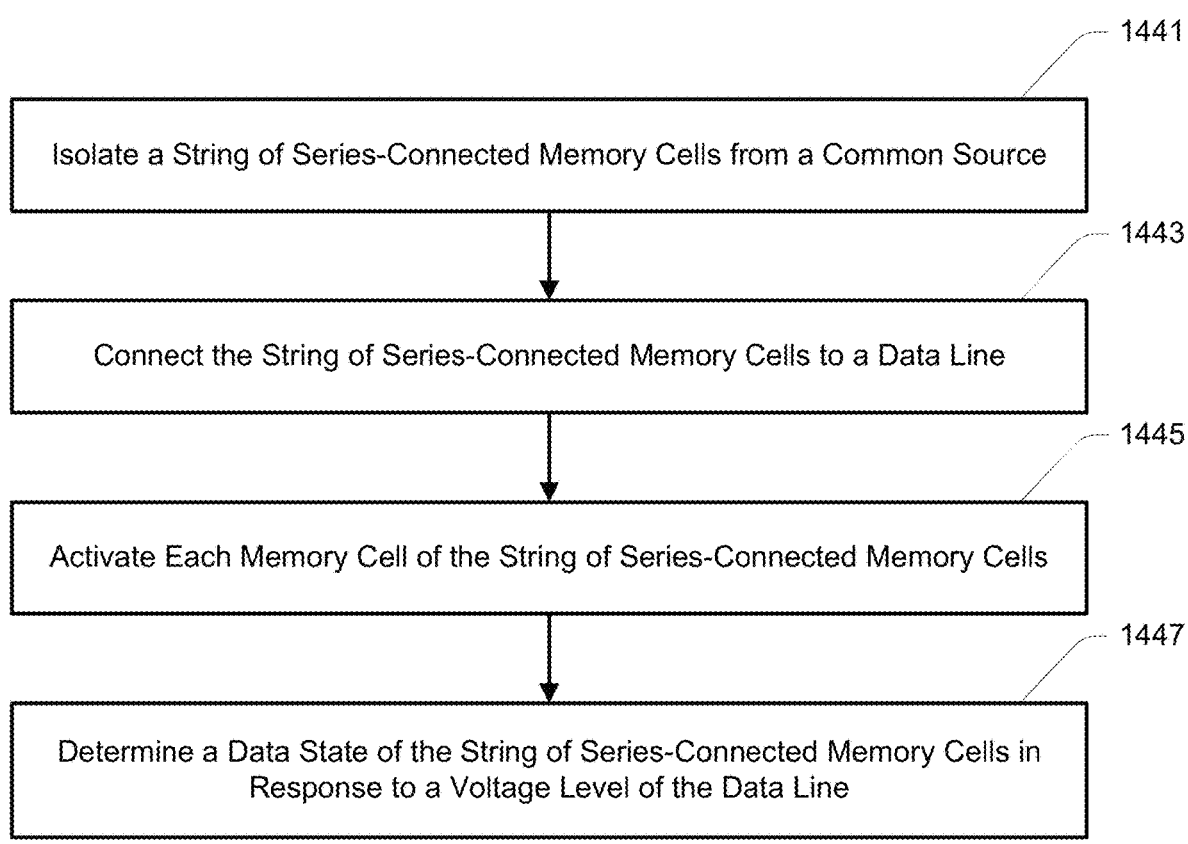
FIG. 14 is a flowchart of a method of operating a NAND memory in accordance with a still further embodiment.

FIG. 14 is a flowchart of a method of operating a NAND memory in accordance with a still further embodiment. The method might represent actions associated with an access operation, e.g., a read operation. The method might be in the form of computer-readable instructions, e.g., stored to the instruction registers 128. Such computer-readable instructions might be executed by a controller, e.g., the control logic 116, to cause the relevant components of the apparatus to perform the method.

At 1441, a string of series-connected memory cells might be isolated from a common source. For example, one or more source select transistors connected between the string of series-connected memory cells and the common source might be deactivated. This might correspond to time period t2-t3 of FIG. 8. Deactivation of a source select transistor might include applying a voltage level to the control gate of the source select transistor configured to deactivate the source select transistor regardless of a voltage level of the common source.

At 1443, the string of series-connected memory cells might be connected to a data line. For example, one or more drain select transistors connected between the string of series-connected memory cells and the data line might be activated. This might correspond to time period t3-t4 of FIG. 8. Activation of a drain select transistor might include applying a voltage level to the control gate of the drain select transistor configured to activate the drain select transistor regardless of a voltage level of the data line.

At 1445, each memory cell of the string of series-connected memory cells might be activated. This might correspond to time period t3-t4 of FIG. 8. Activation of a memory cell might include applying a voltage level to the control gate of the memory cell configured to activate the memory cell, and may further include applying a voltage level to the control gate of the memory cell equal to a voltage level applied to the control gate of the memory cell during programming of a data state to the string of series-connected memory cells, e.g., a voltage level of trace 702 at time t2 of FIG. 7 or at time t9 of FIG. 10.

At 1447, a data state of the string of series-connected memory cells might be determined in response to a voltage level (e.g., a change in voltage level) of the data line. This might correspond to time period t4-t5 of FIG. 8. For example, a sense circuit (e.g., a differential amplifier) might receive the first voltage level of FIG. 8 at one input and might receive the voltage level of the data line at a second input, and might provide an output level indicative of whether the data line voltage level is higher than the first voltage level, indicating that the data state of the string of series-connected memory cells has a first value, or whether the data line voltage level is lower than the first voltage level, indicating that the data state of the string of series-connected memory cells has a second value different than the first value.

Figure 15:
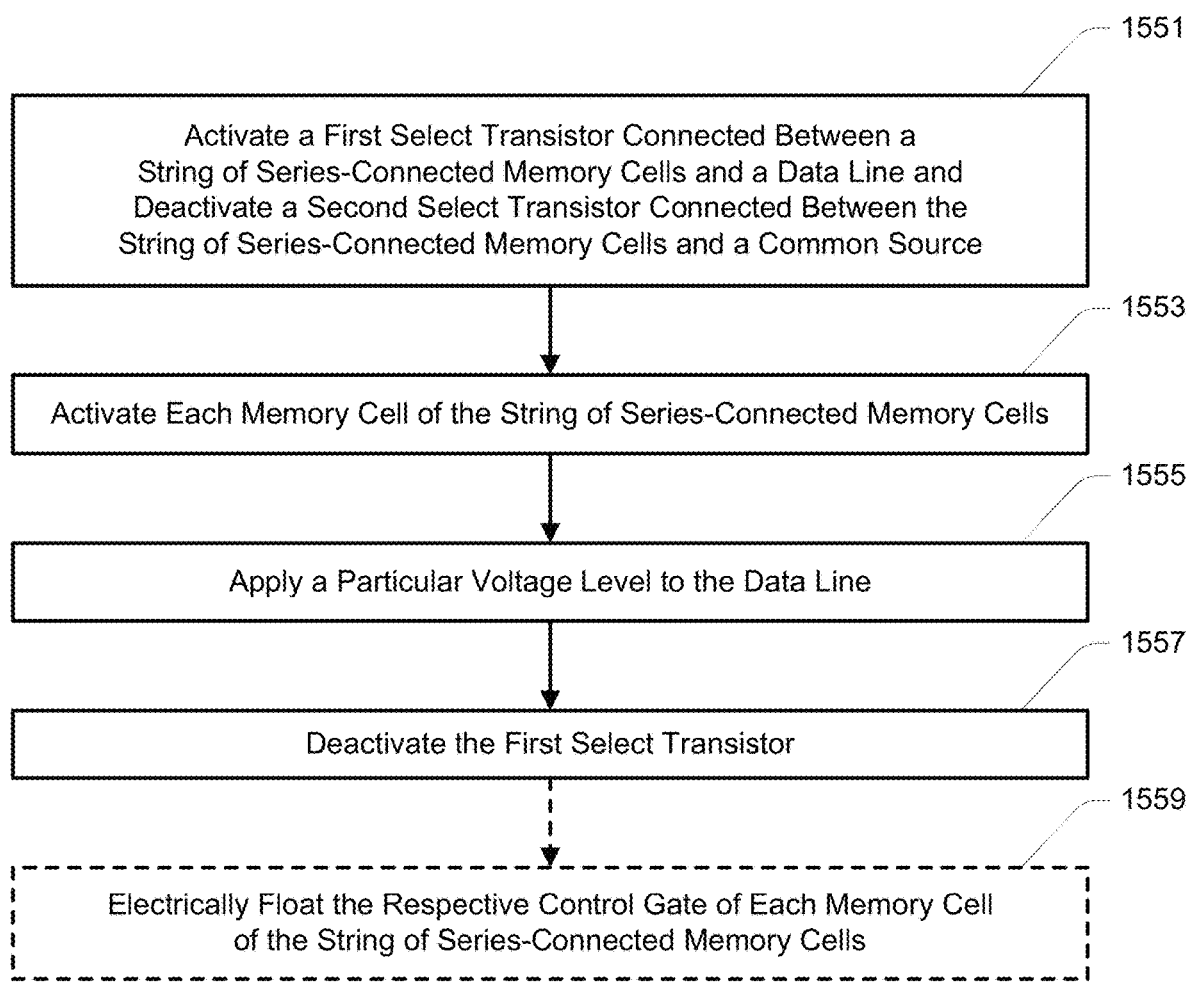
FIG. 15 is a flowchart of a method of operating a NAND memory in accordance with a still further embodiment.

FIG. 15 is a flowchart of a method of operating a NAND memory in accordance with a still further embodiment. The method might represent actions associated with an access operation, e.g., an erase operation. The method might be in the form of computer-readable instructions, e.g., stored to the instruction registers 128. Such computer-readable instructions might be executed by a controller, e.g., the control logic 116, to cause the relevant components of the apparatus to perform the method.

At 1551, a first select transistor connected between a string of series-connected memory cells and a data line might be activated, and a second select transistor connected between the string of series-connected memory cells and a common source might be deactivated. This might correspond to time period t1-t2 of FIG. 9. For example, one or more drain select transistors connected between the data line and the string of series-connected memory cells might be activated, and one or more source select transistors connected between the common source and the string of series-connected memory cells might be deactivated. Activation of a drain select transistor might include applying a voltage level to the control gate of the drain select transistor configured to activate the drain select gate regardless of a voltage level of the data line. Deactivation of a source select transistor might include applying a voltage level to the control gate of the source select transistor configured to deactivate the source select transistor regardless of a voltage level of the common source.

At 1553, each memory cell of the string of series-connected memory cells might be activated. This might correspond to time period t1-t2 of FIG. 9. Activation of a memory cell might include applying a voltage level to the control gate of the memory cell configured to activate the memory cell, and might further include applying a reference potential, e.g., Vss, 0V, or ground.

At 1555, a particular voltage level might be applied to the data line. The particular voltage level might represent a desired channel potential prior to performing a programming operation, e.g., for storage of volatile data to the string of series-connected memory cells. For one embodiment, the particular voltage level might be the reference potential. At 1557, the first select transistor might be deactivated. For example, the one or more drain select transistors connected between the data line and the string of series-connected memory cells might be deactivated. Deactivation of a drain select transistor might include applying a voltage level to the control gate of the drain select transistor configured to deactivate the drain select gate regardless of a voltage level of the data line.

At 1559, the respective control gate of each memory cell of the string of series-connected memory cells might optionally be electrically floated. This might correspond to the time period of time t2 and beyond of FIG. 9. For embodiments using a first voltage level higher than the reference potential, the respective control gate of each memory cell of the string of series-connected memory cells might optionally be discharged prior to electrically floating.

Figure 16A:
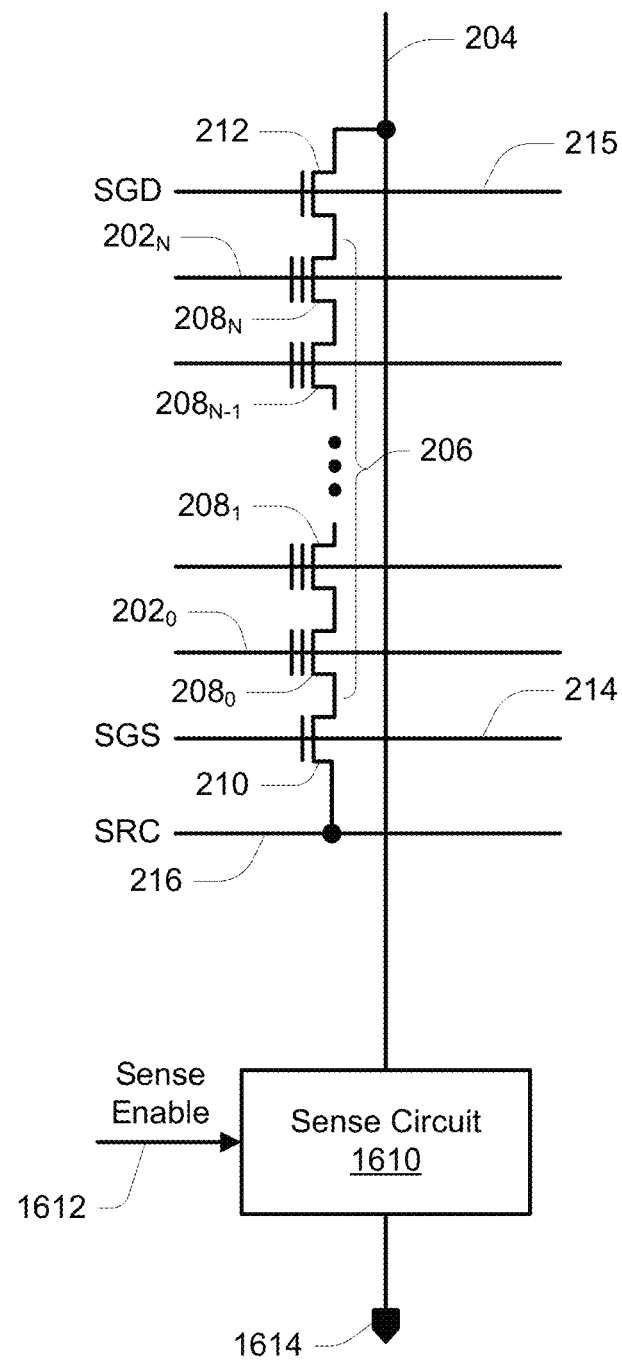
FIGS. 16A-16C are block schematics depicting connection of data lines to one or more sense circuits for use with various embodiments.
Figure 16B:
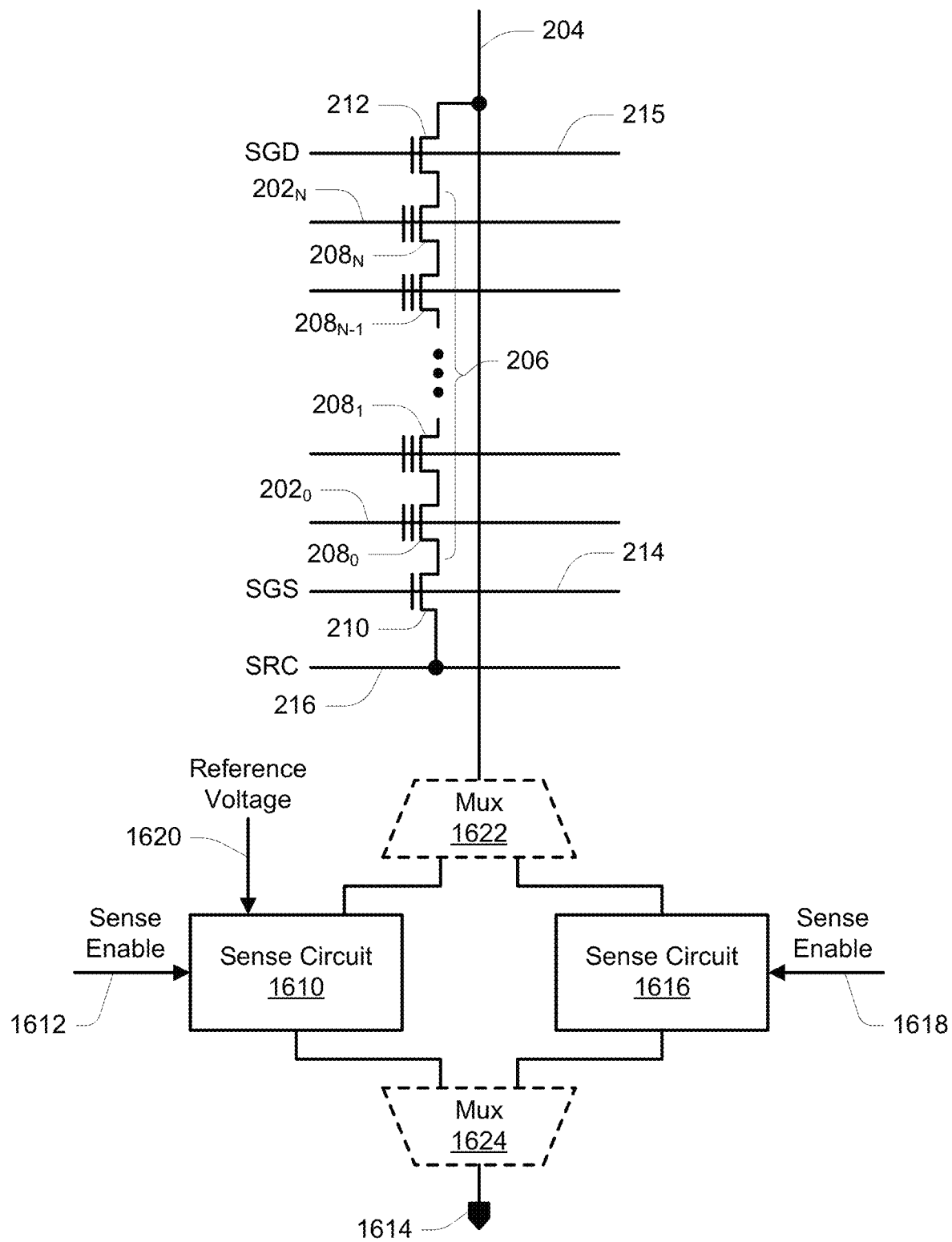
Figure 16C:
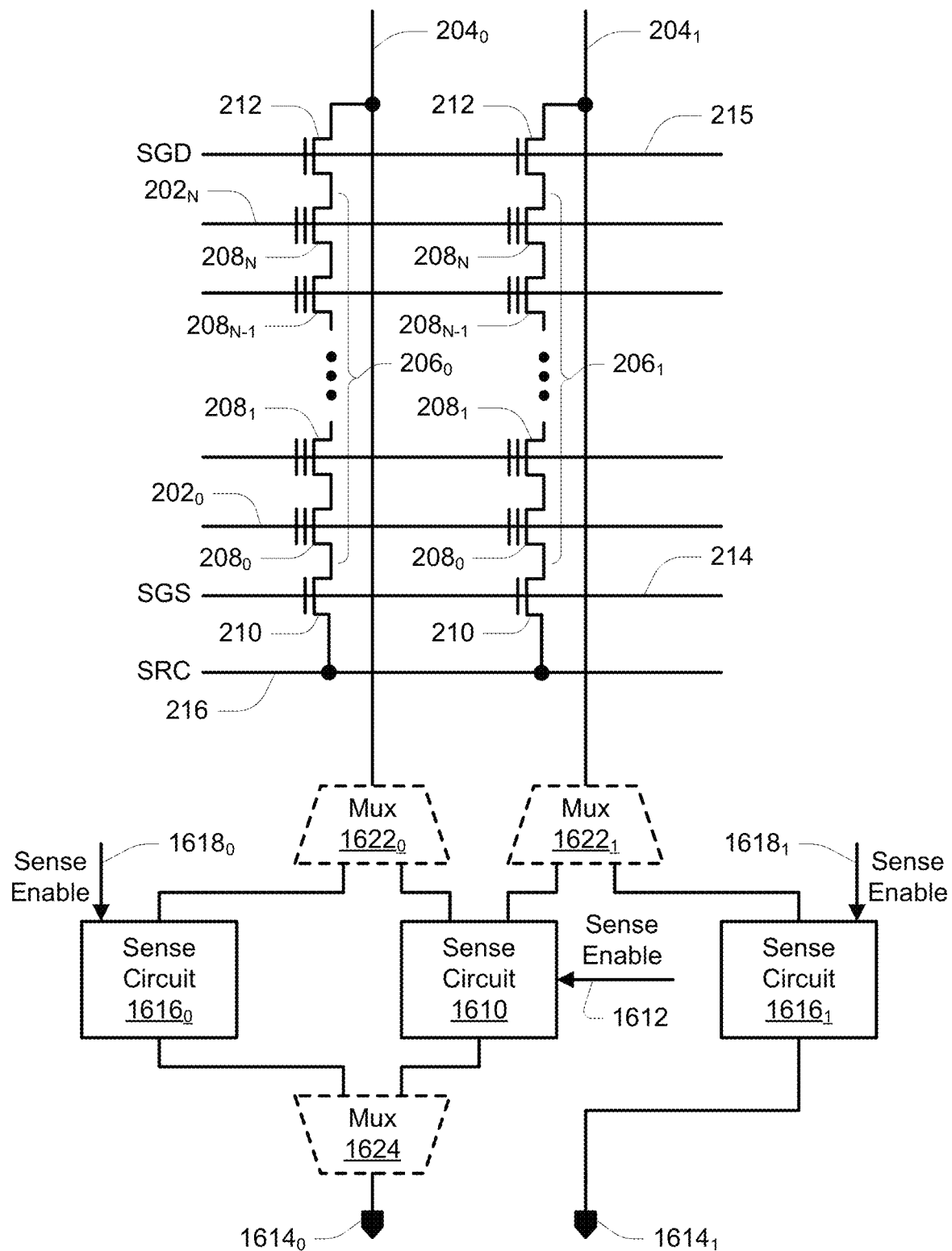

FIGS. 16A-16C are block schematics depicting a connection of a data line to one or more sense circuits for use with various embodiments. In FIG. 16A, a NAND string 206 is selectively connected to a data line 204 through a select transistor 212, and to a source 216 through a select transistor 210. The NAND string 206 might have the same structure as described with reference to FIG. 2A, having N+1 memory cells $208_0$-$208_N$. The data line 204 might be connected to a sense circuit 1610. The sense circuit 1610 might be a differential sense circuit or a single-ended sense circuit. The sense circuit 1610 might be selectively enabled for sensing in response to a sense enable signal 1612.

The nature of such sense circuits 1610 are well understood in the art of semiconductor memory and will not be detailed herein. However, differential sensing might compare a reference voltage level (not depicted in FIG. 16A) to a voltage level of the data line 204 to determine whether the voltage level of the data line 204 (e.g., at or around time t5 of FIG. 8) is higher than (e.g., which may include higher than or equal to) the reference voltage level, or lower than (e.g., which may include lower than or equal to) the reference voltage level, to generate a corresponding output signal at an output 1614 indicative of a data state, e.g., a data state of the NAND string 206 in a first mode of operation (e.g., for volatile storage of data) or a data state of a memory cell of the NAND string 206 in a second mode of operation (e.g., for non-volatile storage of data). In contrast, single-ended sensing might apply a voltage level indicative of a voltage level of the data line 204 to a control gate of a transistor to determine whether the voltage level of the data line 204 is higher than (e.g., which may include higher than or equal to) a threshold voltage of the transistor, or lower than (e.g., which may include lower than or equal to) the threshold voltage of the transistor, to generate a corresponding output signal at the output 1614 indicative of a data state, e.g., a data state of the NAND string 206 in a first mode of operation (e.g., for volatile storage of data) or a data state of a memory cell of the NAND string 206 in a second mode of operation (e.g., for non-volatile storage of data).

It is recognized that operating a NAND string 206 in a volatile storage mode of operation might result in smaller variations of voltage levels in a data line 204 than operating the NAND string 206 is a non-volatile storage mode of operation. As a result, a sense circuit selected or designed for operating in one mode of operation might be less than ideal when operated in the other mode of operation. Accordingly, some embodiments might include a first sense circuit for use when operating in a volatile storage mode of operation, and a second sense circuit for use when operating in a non-volatile storage mode of operation. The embodiment of FIG. 16B facilitates the use of different sense circuits for different modes of operations.

In FIG. 16B, a NAND string 206 is selectively connected to a data line 204 through a select transistor 212, and to a source 216 through a select transistor 210. The NAND string 206 might have the same structure as described with reference to FIG. 2A, having N+1 memory cells $208_0$-$208_N$. The data line 204 might be connected (e.g., which might include selectively connected) to a first sense circuit 1610 and to a second sense circuit 1616. For one embodiment, the first sense circuit 1610 might be a differential sense circuit and the second sense circuit 1616 might be a single-ended sense circuit. The sense circuit 1610 might be selectively enabled for sensing in response to a sense enable signal 1612, and the sense circuit 1616 might be selectively enabled for sensing in response to a sense enable signal 1618.

The sense circuit 1610 might be configured to receive a voltage level of the data line 204 at a first input and a reference voltage 1620 at a second input. The sense circuit 1610 might be configured to compare the voltage level of the data line 204 to the reference voltage 1620, and to provide a signal at its output having a first logic level in response to the voltage level of the data line 204 being higher than (e.g., higher than or equal to) the voltage level of the reference voltage 1620, and having a second logic level, different than the first logic level, in response to the voltage level of the data line 204 being lower than (e.g., lower than or equal to) the voltage level of the reference voltage 1620.

The data line 204 might be selectively connected to one of either the first sense circuit 1610 or the second sense circuit 1616 through an optional multiplexer 1622 that is connected to the data line 204, and connected to the first sense circuit 1610 and the second sense circuit 1616. For such an embodiment, the sense enable signal 1612 and the sense enable signal 1618 might be the same signal. An output of the first sense circuit 1610 and an output of the second sense circuit 1616 might be connected to an optional second multiplexer 1624 to provide a single output 1614 indicative of the sensed data state. Alternatively, where the first sense circuit 1610 and the second sense circuit 1616 are each configured to provide a high impedance on their respective outputs when not enabled for sensing, the output of the first sense circuit 1610 and the output of the second sense circuit 1616 might be commonly connected to provide the single output 1614.

For embodiments without the multiplexer 1622, the data line 204 might be concurrently connected to inputs of both the first sense circuit 1610 and the second sense circuit 1616. For such embodiments, the sense enable signal 1612 might be different than (e.g., complementary to) the sense enable signal 1618 to permit enabling of either the first sense circuit 1610 or the second sense circuit 1616.

In some DRAM devices, each digit of data might be stored to two memory cells programmed to have complementary values. For example, a first data value might be indicated by storing a first logic value to a first memory cell and storing a second logic value different than the first logic value to a second memory cell, and a second data value might be indicated by storing the second logic value to the first memory cell and storing the first logic value to the second memory cell. The respective voltage levels of the corresponding data lines might be provided to a differential sense circuit for comparison to one another. In this manner, small changes in data line voltage levels might be amplified for more accurate sensing. FIG. 16C provides a configuration to permit the use of two NAND strings to store a single data value in a volatile data storage mode. To store a first data value to the pair of NAND strings, a first NAND string might be enabled for programming during a programming operation while a second NAND string might be inhibited from programming during the programming operation. To store a second data value to the pair of NAND strings, the first NAND string might be inhibited from programming during a programming operation while the second NAND string might be enabled for programming during the programming operation.

In FIG. 16C, a first NAND string $206_0$ is selectively connected to a first data line $204_0$ through a select transistor 212, and to a source 216 through a select transistor 210. A second NAND string $206_1$ is selectively connected to a second data line $204_1$ through a select transistor 212, and to the source 216 through a select transistor 210. The first NAND string $206_0$ and the second NAND string $206_1$ might each have the same structure as described with reference to FIG. 2A, each having N+1 memory cells $208_0$-$208_N$.

The first data line $204_0$ might be connected (e.g., which might include selectively connected) to a first sense circuit 1610 and to a second sense circuit $1616_0$. For one embodiment, the first sense circuit 1610 might be a differential sense circuit and the second sense circuit $1616_0$ might be a single-ended sense circuit. The first sense circuit 1610 might be selectively enabled for sensing in response to a sense enable signal 1612, and the second sense circuit $1616_0$ might be selectively enabled for sensing in response to a sense enable signal $1618_0$. The second data line $204_1$ might be connected (e.g., which might include selectively connected) to the first sense circuit 1610 and a third sense circuit $1616_1$. For one embodiment, the third sense circuit $1616_1$ might be a single-ended sense circuit. The third sense circuit $1616_1$ might be selectively enabled for sensing in response to a sense enable signal $1618_1$.

The sense circuit 1610 might be configured to receive a voltage level of the first data line $204_0$ at a first input and a voltage level of the second data line $204_1$ at a second input. The sense circuit 1610 might be configured to compare the voltage level of the first data line $204_0$ to the voltage level of the second data line $204_1$, and to provide a signal at its output having a first logic level in response to the voltage level of the first data line $204_0$ being higher than (e.g., higher than or equal to) the voltage level of the voltage level of the second data line $204_1$, and having a second logic level, different than the first logic level, in response to the voltage level of the first data line $204_0$ being lower than (e.g., lower than or equal to) the voltage level of the voltage level of the second data line $204_1$.

The first data line $204_0$ might be selectively connected to one of either the first sense circuit 1610 or the second sense circuit $1616_0$ through an optional first multiplexer $1622_0$ that is connected to the first data line $204_0$, and connected to the first sense circuit 1610 and the second sense circuit $1616_0$. The second data line $204_1$ might be selectively connected to one of either the first sense circuit 1610 or the third sense circuit $1616_1$ through an optional second multiplexer $1622_1$ that is connected to the second data line $204_1$, and connected to the first sense circuit 1610 and the third sense circuit $1616_1$. For such an embodiment, the sense enable signal 1612 and the sense enable signals $1618_0$ and $1618_1$ might be the same signal. Note that when the first multiplexer $1622_0$ is configured to connect the first data line $204_0$ to the first sense circuit 1610, the second multiplexer $1622_1$ might also be configured to connect the second data line $204_0$ to the first sense circuit 1610. Conversely, when the first multiplexer $1622_0$ is configured to connect the first data line $204_0$ to the second sense circuit $1616_0$, the second multiplexer $1622_1$ might be configured to connect the second data line $204_0$ to the third sense circuit $1616_1$.

An output of the first sense circuit 1610 and an output of the second sense circuit $1616_0$ might be connected to an optional third multiplexer 1624 to provide a first output $1614_0$ indicative of the sensed data state, e.g., a data state of the NAND strings $206_0$ and $206_1$ in a first mode of operation (e.g., for volatile storage of data) or a data state of a memory cell of the first NAND string $206_0$ in a second mode of operation (e.g., for non-volatile storage of data). Alternatively, where the first sense circuit 1610 and the second sense circuit $1616_0$ are each configured to provide a high impedance on their respective outputs when not enabled for sensing, the output of the first sense circuit 1610 and the output of the second sense circuit $1616_0$ might be commonly connected to provide the first output $1614_0$. An output of the third sense circuit $1616_1$ might correspond to a second output $1614_1$ indicative of the sensed data state, e.g., a data state of a memory cell of the second NAND string $206_1$ in the second mode of operation (e.g., for non-volatile storage of data). For some embodiments, where a logical page of memory cells in a non-volatile storage mode includes every other data line 204, e.g., even-odd sensing, the third sense circuit $1616_1$ might be eliminated, with the multiplexers $1622_0$ and $1622_1$ providing a selected one of the data lines $204_0$ and $204_1$ to the second sense circuit $1616_0$ in the non-volatile storage mode of operation.

In the first mode of operation for volatile storage of data to the NAND strings $206_0$ and $206_1$, their data state might have a first value in response to the data line $204_0$ having a voltage level such as depicted in trace $804_0$ of FIG. 8 and the data line $204_1$ having a voltage level such as depicted in trace $804_1$ of FIG. 8, e.g., the voltage level of the data line $204_0$ being higher than the voltage level of the data line $204_1$, and might have a second value in response to the data line $204_0$ having a voltage level such as depicted in trace $804_1$ of FIG. 8 and the data line $204_1$ having a voltage level such as depicted in trace $804_0$ of FIG. 8, e.g., the voltage level of the data line $204_0$ being lower than the voltage level of the data line $204_1$.

CONCLUSION

Although specific embodiments have been illustrated and described herein, it will be appreciated by those of ordinary skill in the art that any arrangement that is calculated to achieve the same purpose might be substituted for the specific embodiments shown. Many adaptations of the embodiments will be apparent to those of ordinary skill in the art. Accordingly, this application is intended to cover any adaptations or variations of the embodiments.

What is claimed is:

1. A memory, comprising:
    an array of memory cells comprising a plurality of strings of series-connected memory cells; and
    a controller for access of the array of memory cells, wherein the controller is configured to cause to memory to:
        access a first string of series-connected memory cells of the plurality of strings of series-connected memory cells in a first mode of operation for volatile storage of data to the first string of series-connected memory cells; and
        access a second string of series-connected memory cells of the plurality of strings of series-connected memory cells in a second mode of operation for non-volatile storage of respective data to each memory cell of a plurality of memory cells of the second string of series-connected memory cells.

2. The memory of claim 1, wherein the controller being configured to cause the memory to access the first string of series-connected memory cells in the first mode of operation for volatile storage of data to the first string of series-connected memory cells comprises the controller being configured to cause the memory to perform an access operation selected from a group consisting of programming volatile data to the first string of series-connected memory cells, reading volatile data from the first string of series-connected memory cells, and erasing volatile data from the first string of series-connected memory cells.

3. The memory of claim 1, wherein the first string of series-connected memory cells and the second string of series-connected memory cells are a same string of series-connected memory cells.

4. The memory of claim 1, wherein the controller is further configured to cause the memory to prohibit accessing the first string of series-connected memory cells of the plurality of strings of series-connected memory cells in the second mode of operation for non-volatile storage of respective data to each memory cell of a plurality of memory cells of the first string of series-connected memory cells.

5. The memory of claim 1, wherein the controller being configured to cause the memory to access the first string of series-connected memory cells in the first mode of operation for volatile storage of data to the first string of series-connected memory cells comprises the controller being configured to cause the memory to:
    isolate the first string of series-connected memory cells from a data line selectively connected to the first string of series-connected memory cells;
    boost a voltage level of a channel material of the first string of series-connected memory cells to have a boosted voltage level; and
    selectively discharge the boosted voltage level of the channel material of the first string of series-connected memory cells to the data line in response to a desired data state of the first string of series-connected memory cells.

6. The memory of claim 1, wherein the controller being configured to cause the memory to access the first string of series-connected memory cells in the first mode of operation for volatile storage of data to the first string of series-connected memory cells comprises the controller being configured to cause the memory to:
    isolate the first string of series-connected memory cells from a common source;
    connect the first string of series-connected memory cells to a data line selectively connected to the first string of series-connected memory cells;
    activate each memory cell of the string of series-connected memory cells; and
    determine a data state of the first string of series-connected memory cells in response to a voltage level of the data line.

7. The memory of claim 1, wherein the controller being configured to cause the memory to access the first string of series-connected memory cells in the first mode of operation for volatile storage of data to the first string of series-connected memory cells comprises the controller being configured to cause the memory to:
    deactivate a first select gate connected between the first string of series-connected memory cells and a data line, and deactivate a second select gate connected between the first string of series-connected memory cells and a common source;
    apply a first voltage level to a respective control gate of each memory cell of a plurality of memory cells of the first string of series-connected memory cells;
    apply a second voltage level to the data line in response to a desired data state of the first string of series-connected memory cells having a first value, and apply a third voltage level, lower than the second voltage level, to the data line in response to the desired data state of the first string of series-connected memory cells having a second value different than the first value;
    apply a fourth voltage level to a control gate of the first select gate configured to deactivate the first select gate in response to applying the second voltage level to the data line and to activate the first select gate in response to applying the third voltage level to the data line; and deactivate the first select gate.

8. A memory, comprising:
an array of memory cells comprising a plurality of strings of series-connected memory cells;
a plurality of access lines, wherein each access line of the plurality of access lines is connected to a respective memory cell of each string of series-connected memory cells of the plurality of strings of series-connected memory cells; and
a controller for access of the array of memory cells, wherein the controller is configured to cause to memory to:
isolate a particular string of series-connected memory cells of the plurality of strings of series-connected memory cells from a data line selectively connected to the particular string of series-connected memory cells;
boost a voltage level of a channel material of the particular string of series-connected memory cells to have a boosted voltage level; and
selectively discharge the boosted voltage level of the channel material of the particular string of series-connected memory cells to the data line in response to a desired data state of the particular string of series-connected memory cells.

9. The memory of claim 8, wherein the controller being configured to cause the memory to boost the voltage level of the channel material of the particular string of series-connected memory cells comprises the controller being configured to cause the memory to apply a first voltage level to each access line of the plurality of access lines to boost the voltage level of the channel material of the particular string of series-connected memory cells.

10. The memory of claim 9, wherein the controller is further configured to cause the memory to float each access line of the plurality of access lines after selectively discharging the boosted voltage level of the channel material of the particular string of series-connected memory cells.

11. The memory of claim 9, wherein the plurality of access lines is less than all access lines connected to respective memory cells of the particular string of series-connected memory cells.

12. The memory of claim 8, wherein the memory further comprises:
a select transistor connected between the particular string of series-connected memory cells and the particular data line;
wherein the controller being configured to cause the memory to selectively discharge the boosted voltage level of the channel of the particular string of series-connected memory cells in response to the desired data state of the particular string of series-connected memory cells comprises the controller being configured to cause the memory to:
apply a first voltage level to the particular data line in response to the desired data state of the particular string of series-connected memory cells having a first value, and apply a second voltage level, lower than the first voltage level, to the particular data line in response to the desired data state of the particular string of series-connected memory cells having a second value different than first value; and
apply a third voltage level to a control gate of the select transistor configured to deactivate the select transistor in response to applying the first voltage level to the particular data line, and configured to activate the select transistor in response to applying the second voltage level to the particular data line.

13. The memory of claim 8, wherein the controller being configured to cause the memory to isolate the particular string of series-connected memory cells from the data line comprises the controller being configured to cause the memory to deactivate a first select gate connected between the particular string of series-connected memory cells and the data line; wherein the controller being configured to cause the memory to boost the voltage level of the channel material of the particular string of series-connected memory cells to have the boosted voltage level comprises the controller being configured to cause the memory to apply a first voltage level to a respective control gate of each memory cell of a plurality of memory cells of the particular string of series-connected memory cells; wherein the controller being configured to cause the memory to selectively discharge the boosted voltage level of the channel material of the particular string of series-connected memory cells to the data line in response to the desired data state of the particular string of series-connected memory cells comprises the controller being configured to cause the memory to apply a second voltage level to the data line in response to the desired data state of the particular string of series-connected memory cells having a first value, and apply a third voltage level, lower than the second voltage level. to the data line in response to the desired data state of the particular string of series-connected memory cells having a second value different than the first value, and to apply a fourth voltage level to a control gate of the first select gate configured to deactivate the first select gate in response to applying the second voltage level to the data line and to activate the first select gate in response to applying the third voltage level to the data line; and wherein the controller is further configured to cause the memory to:
deactivate a second select gate connected between the particular string of series-connected memory cells and a common source concurrently with deactivating the first select gate connected between the particular string of series-connected memory cells and the data line; and
deactivate the first select gate after applying the fourth voltage level to the control gate of the first select gate.

14. The memory of claim 13, wherein the controller being configured to cause the memory to apply the second voltage level to the data line in response to the desired data state of the particular string of series-connected memory cells having the first value comprises the controller being configured to cause the memory to apply the second voltage level to the data line in response to the desired data state of the particular string of series-connected memory cells having the first value or having a third value different than the first value and different than the second value.

15. The memory of claim 14, wherein the controller is further configured to cause the memory to:
apply a fifth voltage level, different than the first voltage level, to the respective control gate of each memory cell of the plurality of memory cells of the particular string of series-connected memory cells;
apply the second voltage level to the data line in response to the desired data state of the particular string of series-connected memory cells having the first value or having the second value, and apply the third voltage level to the data line in response to the desired data state of the particular string of series-connected memory cells having the third value;

apply the fourth voltage level to the control gate of the first select gate; and deactivate the first select gate after applying the fourth voltage level to the control gate of the first select gate.

16. The memory of claim 15, wherein the fifth voltage level is higher than the first voltage level.

17. The memory of claim 13, wherein the first voltage level is higher than a supply voltage level of the memory.

18. A memory, comprising:
   an array of memory cells comprising a plurality of strings of series-connected memory cells;
   a plurality of access lines, wherein each access line of the plurality of access lines is connected to a respective memory cell of each string of series-connected memory cells of the plurality of strings of series-connected memory cells; and
   a controller for access of the array of memory cells, wherein the controller is configured to cause to memory to:
      isolate a particular string of series-connected memory cells of the plurality of strings of series-connected memory cells from a common source;
      connect the particular string of series-connected memory cells to a data line selectively connected to the particular string of series-connected memory cells;
      activate each memory cell of the string of series-connected memory cells; and
      determine a data state of the particular string of series-connected memory cells in response to a voltage level of the data line.

19. The memory of claim 18, wherein the controller being configured to cause the memory to activate each memory cell of the string of series-connected memory cells comprises the controller being configured to cause the memory to apply a reference potential to a respective control gate of each memory cell of the string of series-connected memory cells.

20. The memory of claim 18, wherein the controller being configured to cause the memory to activate each memory cell of the string of series-connected memory cells comprises the controller being configured to cause the memory to apply a particular voltage level to a respective control gate of each memory cell of the string of series-connected memory cells that was applied to the respective control gate of each memory cell of the string of series-connected memory cells during programming of the string of series-connected memory cells.

* * * * *